(12) United States Patent
Fujii et al.

(10) Patent No.: US 7,870,104 B2
(45) Date of Patent: Jan. 11, 2011

(54) STORAGE SYSTEM AND STORAGE DEVICE ARCHIVE CONTROL METHOD

(75) Inventors: Tetsuhiko Fujii, Odawara (JP); Akira Murotani, Odawara (JP)

(73) Assignee: Hitachi, Ltd., Tokyo (JP)

( * ) Notice: Subject to any disclaimer, the term of this patent is extended or adjusted under 35 U.S.C. 154(b) by 407 days.

(21) Appl. No.: 12/134,194

(22) Filed: Jun. 6, 2008

(65) Prior Publication Data

US 2008/0235304 A1 Sep. 25, 2008

Related U.S. Application Data

(63) Continuation of application No. 11/091,651, filed on Mar. 29, 2005, now abandoned.

(30) Foreign Application Priority Data

Feb. 7, 2005 (JP) ............................. 2005-030366

(51) Int. Cl.
G06F 17/30 (2006.01)
(52) U.S. Cl. .................. 707/689; 707/694; 707/793; 711/159
(58) Field of Classification Search ............. 707/609, 707/694, 793; 711/159
See application file for complete search history.

(56) References Cited

U.S. PATENT DOCUMENTS

| 5,043,967 | A | 8/1991 | Gregg et al. |
| 5,210,734 | A | 5/1993 | Sakurai |
| 5,765,152 | A * | 6/1998 | Erickson .............................. 1/1 |
| 6,098,148 | A | 8/2000 | Carlson |
| 6,185,661 | B1 | 2/2001 | Ofek et al. |
| 6,353,834 | B1 | 3/2002 | Wong et al. |
| 6,618,751 | B1 * | 9/2003 | Challenger et al. .......... 709/213 |
| 6,748,494 | B1 * | 6/2004 | Yashiro ........................ 711/133 |
| 7,092,977 | B2 * | 8/2006 | Leung et al. ......................... 1/1 |
| 7,107,416 | B2 * | 9/2006 | Stuart et al. .................. 711/159 |

(Continued)

FOREIGN PATENT DOCUMENTS

JP 2001344178 12/2001

(Continued)

OTHER PUBLICATIONS

Jenna Leavitt, Designing a Compliant Record Retention Policy for Your Business, Pillsbury, vol. 2, pp. 1-5.*

(Continued)

*Primary Examiner*—Luke S. Wassum
*Assistant Examiner*—Sherief Badawi
(74) *Attorney, Agent, or Firm*—Brundidge & Stanger, P.C.

(57) ABSTRACT

An archive management that allows random access. An archive managing part reads out files stored in an on-line volume at a timing determined by the respective file type, and stores these files in a specified volume among archive volumes. A retention term is designated for each set of file data, and respective retention terms are also set for the respective volumes. The file data is stored in a volume having a retention term that matches the retention term of the file data. The respective volumes are set in a device that allows random access. The areas in which data is written into the respective volumes are managed as write prohibited areas by pointers such that the respective volumes are used as a WORM device.

15 Claims, 29 Drawing Sheets

U.S. PATENT DOCUMENTS

| | | | |
|---|---|---|---|
| 7,269,612 B2* | 9/2007 | Devarakonda et al. | 707/694 |
| 7,363,326 B2* | 4/2008 | Margolus | 707/663 |
| 7,366,834 B2* | 4/2008 | McGovern et al. | 711/112 |
| 7,380,064 B2* | 5/2008 | Murotani et al. | 711/133 |
| 7,392,234 B2* | 6/2008 | Shaath et al. | 1/1 |
| 7,472,238 B1* | 12/2008 | Gokhale et al. | 711/159 |
| 7,526,621 B2* | 4/2009 | Stuart et al. | 711/159 |
| 7,580,961 B2* | 8/2009 | Todd et al. | 1/1 |
| 2002/0194452 A1 | 12/2002 | Catherwood | |
| 2005/0076066 A1* | 4/2005 | Stakutis et al. | 707/200 |
| 2005/0097260 A1* | 5/2005 | McGovern et al. | 711/100 |
| 2005/0223242 A1* | 10/2005 | Nath | 713/193 |
| 2006/0010150 A1* | 1/2006 | Shaath et al. | 707/102 |
| 2006/0053250 A1* | 3/2006 | Saze | 711/114 |
| 2006/0053262 A1* | 3/2006 | Prahlad et al. | 711/162 |
| 2006/0072400 A1* | 4/2006 | Anderson et al. | 369/47.1 |
| 2006/0075007 A1* | 4/2006 | Anderson et al. | 707/206 |
| 2006/0101084 A1* | 5/2006 | Kishi et al. | 707/200 |
| 2010/0174677 A1* | 7/2010 | Zahavi et al. | 707/609 |

FOREIGN PATENT DOCUMENTS

| | | |
|---|---|---|
| WO | 0225445 A2 | 3/2002 |
| WO | 02254445 | 3/2002 |

OTHER PUBLICATIONS

SearchExchange.com, E-mail Archiving School: What E-mail Retention Policy is Right for You, Zantaz, pp. 1-7.*

* cited by examiner

FIG. 6A

| ARCHIVE MANAGEMENT TABLE | | | T1 |
|---|---|---|---|
| ARCHIVING OBJECT FILE OR DIRECTORY | RETENTION TERM | ARCHIVE TIMING | |
| FILE 1 | 1 YEAR | MANUAL OPERATION | |
| FILE 2 | 3 YEARS | DAILY AT NOON | |
| ... | ... | ... | |

FIG. 6B

| WRITE PROHIBITING POINTER MANAGEMENT TABLE (T2) | |
|---|---|
| DATE | POINTER ADDRESS |
| Date1 | LBA#0 |
| Date2 | LBA#200 |
| Date3 | LBA#501 ← MOST RECENT WRITE PROHIBITED POSITION |

FIG. 14

ARCHIVE MANAGEMENT TABLE — T10

USER DOCUMENT TYPE — T11

| FILE PATH INFORMATION | RETENTION TERM |
|---|---|
| ¥C:User/File_A | 365 |
| ¥C:User/File_B | 1095 |
| ... | ... |

CONTROL FILE TYPE — T12

| FILE PATH INFORMATION | RETENTION TERM | ARCHIVE TIMING |
|---|---|---|
| ¥C:User/File_C | 365 | EVERY DAY |
| ¥C:User/File_D | 1095 | EVERY WEEK |
| ... | ... | ... |

BATCH JOB FILE TYPE — T13

| FILE PATH INFORMATION | RETENTION TERM |
|---|---|
| ¥C:User/File_E | 365 |
| ¥C:User/File_F | 1095 |
| ... | ... |

STORAGE SYSTEM AND STORAGE DEVICE ARCHIVE CONTROL METHOD

CROSS-REFERENCE TO RELATED APPLICATIONS

The present application is a continuation of application Ser. No. 11/091,651, filed Mar. 29, 2005 now abandoned; which relates to and claims priority from Japanese Patent Application No. 2005-30366 filed on Feb. 7, 2005, the entire disclosure of which is incorporated herein by reference.

BACKGROUND OF THE INVENTION

1. Field of the Invention

The present invention relates to a storage system and a storage device archive control method.

2. Description of the Related Art

For example, a storage device constructs storage areas based on an RAID (redundant array of independent disks) using a memory device such as a hard disk drive, semiconductor memory drive or the like. For example, these physical storage areas (logical volumes) are provided to a host computer such as a server machine or the like.

The host computer provides information processing services to client terminals connected to the host computer by writing data into the logical volumes and reading data out of the logical volumes. For example, various types of data such as email data, customer control data and the like are accumulated in the logical volumes hour to hour and minute to minute. Accordingly, for example, an email archive system that is devised so that email data can be automatically archived has been proposed (Japanese Patent Application Laid-Open No. 2001-344178).

In the archive system described in the abovementioned patent, email data of various independent formats can be stored in a common data base. In this patent, however, there is no mention of the device that is used to store the email data. For example, in cases where email data is simply stored in a hard disk drive or the like, there is a possibility that the data may be altered. Moreover, for example, in cases where data is stored in add-on devices such as CD-Rs or the like in order to prevent data alteration, since such devices have a relatively low output speed, such storage is inconvenient for later data utilization.

SUMMARY OF THE INVENTION

Accordingly, it is an object of the present invention to provide a storage system and a storage device archive control method which are devised so that this system and method can produce add-on type volumes using a random access storage device, and be utilized for the storage of data files. It is another object of the present invention to provide a storage system and a storage device archive control method which are devised so that this system and method can prevent data alteration, and can improve future data utilizability. It is another object of the present invention to provide a storage system and a storage device archive control method which make it possible to prevent data alteration, and which allow the repeated re-utilization of the storage device. Still other objects of the present invention will become clear from the following description of embodiments.

In order to solve the abovementioned problems, the storage system according to a first aspect of the present invention is a storage system comprising a host device and a storage device, wherein the storage device comprises one or more memory devices that allow random access, volumes which are produced on the basis of the memory devices, and to which retention terms are assigned, and a control part which performs data input/output with volumes in response to requests from the host device. Furthermore, the host device comprises a file managing part which transmits one or more sets of file data conforming to the retention terms to the storage device and stores the sets of file data in the volumes. Moreover, the control part writes the file data input from the host device into space areas of the volumes sequentially from the head of the file data, and controls the areas into which file data has been written as write prohibited areas.

For instance, hard disk drives, semiconductor memory drives, flexible disk drives and the like may be cited as examples of random access memory devices. For example, volumes for storing file data may be disposed on physical memory areas that are respectively supplied by a plurality of memory devices. For example, retention terms, e.g., one year, three months or the like, are assigned beforehand to these volumes. Specifically, volumes can be respectively prepared for each of these retention terms.

The file managing part of the host transmits file data to the storage device with the retention term designated beforehand. The retention term for the file data transmitted from the host matches the retention term that is assigned to the volume that stores this file data. Such match of both retention terms is referred to in the present specification as "conformity of the retention terms".

The control part of the storage device successively writes the file data into space areas of the volumes from the head of the file data. The space areas of the volumes are used in succeeding order for each set of file data. In succeeding order from the head address of the space area, the control part successively writes in the file data from the head of the file data. Specifically, file data is sequentially written into random access volumes. Then, when the writing of this file data is completed, the control part controls the storage area into which the file data has been written as a write prohibited area. The term "write prohibited area" refers to an area into which writing is prohibited. Furthermore, the read-out of file data from a write prohibited area may be permitted.

As a result, in the present invention, random access volumes can be used as add-on type volumes as in a so-called WORM (write once read many) device, and file data can be stored (archived). Furthermore, as a result of random access, the object file data can be accessed at a relatively high speed, so that the convenience of the system is improved. Moreover, for example, the file managing part can be called an archive manager, and the control part can be called a storage controller.

The file managing part can transmit file data of a plurality of different types conforming to respective retention terms to the storage device, and can respectively store such file data in the volumes. For example, file data with respectively different triggers used to cause storage in the volumes may be cited as such file data of a plurality of different types. Such triggers include triggers with periodicity and triggers that are aperiodic.

For instance, in cases where the user indicates archiving execution (including backup) for file data of a first file type created by the user using application programs such as document creation applications, tabular calculation applications or the like, this file data is stored in the volumes. Specifically, storage in the volumes is indicated by the user a periodically (occasionally as required) in the case of file data belonging to the first file type.

On the other hand, for example, in the case of control files such as system files using the OS (operating system), construction setting files and the like, storage in the volumes is periodically indicated by the manager. These control files can be classified as files of the second file type.

Furthermore, for example, file data created by a batch job program can be backed up immediately after being created. In the case of such batch job files, storage in the volumes is indicated a periodically by the batch job program. File data of this type can be called file data of the third file type.

Thus, in regard to archiving, file data created by the host has a plurality of respectively different attributes. The first attribute is the retention term. The second attribute is the trigger for the execution of archiving. Furthermore, the storage destination volume for the file data is selected on the basis of the first attribute. Accordingly, a plurality of different types of file data with common first attributes and with respectively different second attributes are stored in mixed storage in the selected volumes.

As one method for managing write prohibited areas, the control part can use write prohibiting pointers that are used to detect the range of write prohibited areas. In one embodiment of the present invention, the control part manages the end addresses of the file data that is written into the volumes by means of write prohibiting pointers.

The control part judges whether or not access requests from the host relate to write prohibited areas by comparing address information contained in the access requests from the host device with the end addresses indicated by the write prohibiting pointers, and prohibits writing into write prohibited areas. For example, the write starting address and data size are clearly indicated in the access requests from the host. If the write starting address precedes the end address (i.e., if the value of the write address is smaller than the value of the end address), the control part can judge that this is a request for access to a write prohibited area. In cases where this access request is a write request, the control part rejects the execution of this write request. For example, rejection of the execution of such a write request is accomplished by a notification from the control part to the host that the write request cannot be executed.

In another embodiment of the present invention, a plurality of write prohibiting pointers are used in order to detect (respectively) the beginning and end of each write prohibited area. The first write prohibiting pointers constitute position information indicating the head address of the file data written into the volume, i.e., the starting address of the write prohibited area. The second write prohibiting pointers constitute position information indicating the end address of the file data written into the volume, i.e., the end address of the write prohibited area.

The control part can judge whether or not an given access request from the host device relates to a write prohibited area by comparing the head address and end address respectively indicated by the first write prohibiting pointer and second write prohibiting pointer contained in the access request, and can prohibit writing into write prohibited areas.

In another embodiment of the present invention, the control part manages the elapsed time from the storage of file data in the volumes, and in cases where the elapsed time reaches the retention term, the control part reuses the areas in which such file data has been stored as space areas. File data with the same retention term is added in succeeding order to the volumes. Accordingly, respective sets of file data stored in the volumes finish the designated retention term in the order in which these sets of file data were stored.

There is no need to continue the storage of file data for which the elapsed time following storage has reached the retention term. Accordingly, the control part releases the areas in which such file data for which there is no longer a need for storage is stored as space areas, and reuses these areas for the storage of new file data. Consequently, at a certain point in time, write prohibited areas may be present in volumes in a form in which space areas are respectively present before and after these write prohibited areas, so that such write prohibited areas are sandwiched between these space areas. As time passes, the areas in which old file data is stored are released. Meanwhile, as time passes, new file data is successively recorded in the space areas that succeed write prohibited areas.

Accordingly, write prohibited areas move through the empty spaces of the volumes as time passes, although this also varies according to the size of the volumes, frequency of archiving of file data, size of the file data and the like. As a result, volumes can be repeatedly used, so that archive control can be performed at a relatively low cost.

In one embodiment of the present invention, when a write request is issued to the storage device, the file managing part acquires the head addresses of space areas of volumes from the control part beforehand, and determines the write starting addresses of the write requests on the basis of these acquired head addresses. As a result, file data can be written and stored sequentially from the heads of space areas succeeding write prohibited areas.

In one embodiment of the present invention, the file managing part can issued volume initialization requests to the control part. Then, on the basis of these volume initialization requests, the control part changes write prohibited areas to space areas. As a result, for example, old volumes that have become filled with file data can be reutilized as empty volumes.

In one embodiment of the present invention, in case where space areas of a quantity at least sufficient to store the file data are not present in a given volume, the control part causes file data to be stored using another volume to which a retention term that is the same as the retention term assigned to the first volume is assigned. For example, the control part can newly create another volume for which the same retention term is set. Furthermore, for example, the control part can also set a retention term that matches the retention term of the file data for an unused volume that has no set retention term, and can use this volume. In addition, for example, the control part can search for another volume for which the same retention term has already been set, and can store the file data in this empty volume.

In one embodiment of the present invention, each volume comprises a file management area and a data storage area. File data that is input from the host device is stored in the data storage area in a non-rewritable manner. First file management information that is used to manage the file data stored in the data storage area is stored in a re-writable manner in the file management area. As a result, even in cases where the data storage area is repeatedly utilized in a sequential manner, the file data in the volumes can be managed by occasionally storing first file management information in the file management area. Furthermore, desired first file management information can be read out relatively quickly by randomly accessing the file management area.

In one embodiment of the present invention, second file management information that is used to manage file data is stored in the data storage area in a non-rewritable manner in association with the file data. Furthermore, the first file management information and second file management information are associated. Since the file management area is a storage area that allows rewriting, it is conceivable (for example) that some or all of the first file management information might be lost in cases of excessive access. In such cases, the first file management information of the file management area can be restored on the basis of the second file management information stored in the data storage area.

Here, the head address of the file data that is to be stored next may also be included in the second file management information. Accordingly, the storage starting address of the file data that is to be stored next can be determined as a preparation by referring to the previously stored second file management information. Furthermore, the file data proper can be stored following the second file management information in the data storage area. Accordingly, as a preparation, the second file management information can be traced in succeeding order, and all of the second file management information can be read out relatively quickly. As a result, the file management information can be restored in a relatively short time.

In still another embodiment of the present invention, in cases where file data is respectively stored in a plurality of generations with respectively different storage times in the volumes, the file managing part can use directory names as the file names of such file data, and can provide time information that can discriminate the plurality of generations as file names for each of the respective generations. For example, in cases where file data is completed via corrections that are performed a multiple number of times, there may be instances in which this file data is stored in a volume each time that such corrections are performed. In such cases, a plurality of generations of file data with respectively different contents are present together in the volume in spite of the fact that the file name is the same.

In cases where a plurality of generations of file data with the same file name are thus present, the file managing part uses the common file name as a virtual directory name. Then, for example, the file managing part uses time information that distinguishes the respective generations inside this virtual directory as file names for the respective generations, and displays these file names. Specifically, in a case where the file data with a file name of "file1.txt" is respective stored in a volume in December 2004 and January 2005, the original file name is used as the directory name, and the respective storage dates are displayed as individual file names. As a result, the user can immediately specify and select file data of the desired generation.

The storage device archive control method of the present invention is an archive control method for storing file data input from a host device in volumes of a storage device, comprising the steps of creating volumes on the basis of one or more memory devices that allow random access, assigning retention terms designated by the host device to the created volumes, receiving the file data from the host device, selecting a volume for which the same term as the retention term associated with the received file data has been set, detecting space areas in the selected volume, writing the received file data into the detected space areas in succeeding order from the head, and controlling the areas into which this file data has been written as write prohibited areas.

The storage device according to still another aspect of the present invention is a storage device comprising one or more memory devices that allow random access, one or more volumes that are respectively created on the basis of these memory devices for each of respectively different retention terms, and a control part that performs data input/output with the volumes in response to requests from a host device, wherein in cases where file data is input from the host device, the control part (1) selects a volume having a retention term that matches the retention term designated for the file data from the volumes, (2) writes the file data into a space area of the selected volume sequentially from the head of the file data, and (3) controls the area into which the file data is written as a write prohibited area.

For example, there may be cases in which all or part of the functions, means and steps of the present invention can be constructed as computer programs that can be executed by a micro-program. Furthermore, such computer programs can be fixed and distributed on a memory medium such as a hard disk, optical disk, semiconductor memory or the like. Alternatively, such computer programs can be transmitted via a communications network such as the internet or the like.

BRIEF DESCRIPTION OF THE DRAWINGS

FIG. 6 (a) is an explanatory diagram showing the archive managing table;

FIG. 6 (b) is an explanatory diagram showing the write prohibiting pointer managing table;

FIG. 14 is an explanatory diagram showing an archive managing table that manages archives according to file type;

DESCRIPTION OF THE PREFERRED EMBODIMENTS

Embodiments of the present invention will be described below with reference to the attached figures. In these embodiments, as will be described below, specified retention terms are set for memory devices that allow random access, and file data is sequentially written into these memory devices, and managed in a non-rewritable manner.

Figure 1:
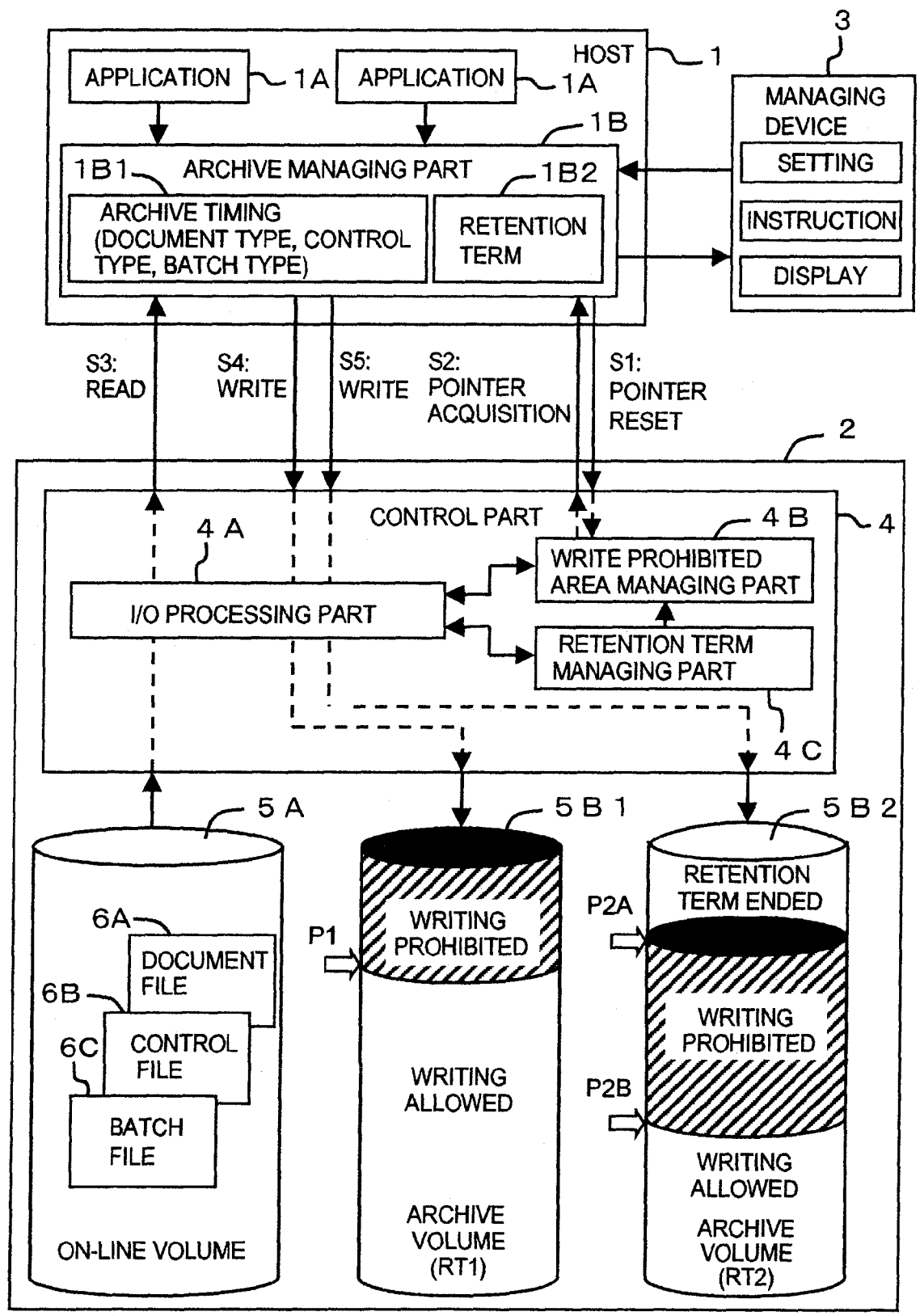
FIG. 1 is an explanatory diagram showing an embodiment of the present invention in schematic terms.

FIG. 1 is an overall schematic diagram of the present embodiment. Although details will be described later, as is shown in FIG. 1, the host device 1 (hereafter referred to as the "host") of the present embodiment is connected to a storage device 2 via (for example) an FC_SAN (fibre channel-storage area network), LAN (local area network) or the like so that communications can be performed in both directions.

The application program (hereafter referred to as the "application") 1A of the host 1 provides a specified information processing service to client terminals not shown in the figures by reading and writing data from and into the storage device 2.

The archive managing part 1B manages files that are archived in the storage device 2. The archive managing part 1B comprises timing information 1B1 that is used to control the archive timing, and retention term information 1B2 that is used to control the retention term of the file data.

On the basis of instructions from a managing device 3, the archive managing part 1B prepares volumes corresponding to specified retention terms in the storage device 2. Furthermore, the archive managing part 1B can initialize volumes that have already been created, and can reutilize these volumes in correspondence to other retention terms.

For example, the storage device 2 can be constructed as a disk array device. The storage device 2 can be constructed so that this storage device 2 comprises a control part 4, an on-line volume 5A, and a plurality of archive volumes 5B1 and 5B2.

The control part 4 controls the overall operation of the storage device 2, and performs data input/output with respect to the respective volumes 5A, 5B1 and 5B2 in response to access requests from the host 1. The processing of access requests is executed by an I/O (input/output) processing part 4A. The write prohibited area managing part 4B performs a management function so that other data is not overwritten in areas in which file data has already been written in the archive volumes 5B1 and 5B2. The retention term managing part 4C manages whether or not the retention term of file data stored in the archive volumes 5B1 and 5B2 has expired.

The on-line volume 5A is a volume that is used by the host 1; various types of file data 6A, 6B and 6C respectively stored in this volume. For example, the on-line volume 5A, like the archive volumes 5B1 and 5B2, is created utilizing a storage area of a storage device that allow random access such as a hard disk drive or the like.

The document files 6A belonging to the first file type are file that are created by the user. The archive timing of the document files 6A (i.e., the time at which these files are stored in an archive volume) is determined by the user.

The control files 6B belonging to the second file type are control files that are used by the OS of the host 1 (such as system files, construction setting files, installation history files and the like). For instance, these control files 6B are managed by the system manager. The control files 6B are stored in the archive volume 5B1 or 5B2, or both, at a specified period determined by the system manager.

The batch job files 6C belonging to the third file type are created by a batch job program. These batch job files can be stored in the archive volume 5B1 or 5B2, or both, at the point in time at which the batch job program creates these batch job files 6C (i.e., the point in time of updating).

Respectively different retention terms RT1 and RT2 are set beforehand for the archive volumes 5B1 and 5B2. These retention terms RT1 and RT2 are managed by the retention term managing part 4C. The retention terms of the file data differ according to the type, object and the like of the file data; for example, these retention terms are set as 1 year, 3 years, 7 years or the like.

For example, the control part 4 respectively creates archive volumes 5B1 and 5B2 corresponding to respective retention terms, such as volumes for 1 year retention, volumes for 3 year retention and the like, in accordance with the respective retention terms of the respective files 6A through 6C stored in the on-line volume 5A.

In the case of the respective archive volumes 5B1 and 5B2, writing into write prohibited areas is prohibited by means of respective write prohibiting pointers P. In other words, areas into which file data can be written in the archive volumes 5B1 and 5B2 are regulated by means of write prohibiting pointers P.

In the first archive volume 5B1, write prohibited areas and areas into which writing is allowed (space areas) are distinguished by means of a single write prohibiting pointer P1. In the second archive volume 5B2, write prohibited areas and areas into which writing is allowed are distinguished using a plurality of pointers, i.e., a first write prohibiting pointer P2A and a second write prohibiting pointer P2B. The first write prohibiting pointer P2A indicates the head address of the oldest file data stored in the archive volume 5B2. Accordingly, this pointer P2A can be called a write prohibited area starting pointer or head pointer. The second write prohibiting pointer P2B indicates the end address of the most recent file data stored in the archive volume 5B2. Accordingly, this point P2B can be called a write prohibited area end pointer or final end pointer.

File data is continuously stored in sequence from the head address in the respective archive volumes 5B1 and 5B2. Specifically, respective sets of file data are continuously stored without deletion from the head of each volume toward the tail of the volume. Furthermore, the write prohibiting pointers P1 and P2B move to the end address each time that the most recent file data is stored.

Respective retention terms RT1 and RT2 are set for the respective archive volumes 5B1 and 5B2, and file data corresponding to these retention terms RT1 and RT2 is stored in the respective archive volumes 5B1 and 5B2. For example, assuming that RT1=1 year and RT2=3 years, then file data for which a retention term of 1 year has been set is stored in the first archive volume 5B1, and file data for which a retention term of 3 years has been set is stored in the second archive volume 5B2.

Only sets of file data with the same retention term are respectively stored in the respective archive volumes 5B1 and 5B2. Accordingly, within the respective volumes 5B1 and 5B2, the retention terms expire in succeeding order from the oldest file data, so that the need for retention is eliminated. When the retention term expires, this refers to a case in which the time elapsed from the initial storage of the file data in the archive volume has reached the retention term set for this archive volume (i.e., the retention term designated for the file data).

Accordingly, if the position of the first write prohibiting pointer P2A is moved to the end address of the file data whose retention term has expired, the area in which this file data was stored is released, and the area is changed to an area into which writing is allowed. In other words, as a result of the position of the first write prohibiting pointer P2A being updated, the attributes of the areas storing data whose retention term has expired are changed from "writing prohibited" to "writing allowed".

Next, the operation of this embodiment will be described. First, the archive managing part 1B orders the control part 4 to reset the write prohibiting pointer (S1). Then, the archive managing part 1B acquires the initial value of the write prohibiting pointer from the control part 4 (S2). As a result, the archive managing part 1B can utilize the archive volumes 5B1 and 5B2.

The application 1A can access a desired file stored in the on-line volume 5A, and can read out file data (S3). Furthermore, although this is not shown in the figures, the application 1A can also update all or part of the read-out file data, and can store this data in the on-line volume 5A.

When the archive timing set by the managing device 3 arrives, the archive managing part 1B reads out the specified data that is the object of archiving from the on-line volume 5A (S3).

The archive managing part 1B stores this read-out file data in a specified archive volume 5B1 or 5B2 (S4, S5). In other words, the archive managing part 1 checks the retention term set for the file data that is the object of archiving, and stores the file data in an archive volume set at a retention term that matches this retention term. Accordingly, only file data with the same retention term is respectively stored in the respective archive volumes 5B1 and 5B2. The respective expirations of the retention terms are met in succeeding order from the file data that was archived first.

As a result of being constructed as described above, the present embodiment has the following merits. In the present embodiment, the file data of respective files 6A through 6C can be sequentially stored in archive volumes 5B1 and 5B2 that allow random access. As a result, in the present embodiment, the archive volumes 5B1 and 5B2 can be used as a WORM device. Accordingly, for example, compared to an optical disk medium such as a CD-R or the like, the archived file data can be read out relatively quickly, so that the convenience of the system is improved.

In the present embodiment, the various files 6A through 6C with respectively different attributes relating to archiving can be stored in the same or different archive volumes 5B1 and 5B2 in accordance with the designated retention terms. Specifically, for the respective files 6A through 6C, the respective retention terms are designate by the user or manager as a first attribute relating to archiving. Furthermore, the respective files 6A through 6C have the time of storage (archiving execution) in the archive volumes 5B1 and 5B2 as a second attribute relating to archiving, and are respectively archived at a timing originating in the respective file types. In the present embodiment, even in the case of a plurality of different types of files 6A through 6C with respectively different archiving execution timings, the files can be stored in archive volumes corresponding to the retention term in cases where the designated retention terms are equal.

In the present embodiment, areas in which file data has already been stored are managed as write prohibited areas using write prohibiting pointers P. Accordingly, the archive volumes 5B1 and 5B2 can be used as a WORM device by means of a relatively simple construction.

In the present embodiment, pointers P2A and P2B that respectively detect the heads and ends of the write prohibited areas are used. Furthermore, in the present embodiment, the elapsed time from the storage of file data in the archive volume 5B2 is managed. In cases where this elapsed time reaches the retention term, the area in which this file data was stored is reused as a space area. As a result, the archive 5B2 can be repeatedly utilized, so that the cost of archive management can be reduced.

In the present embodiment, archive volumes in use can be re-utilized by resetting the write prohibiting pointers P. Accordingly, for example, in cases where the retention of stored file data becomes unnecessary as a result of editing or the like by the enterprise or organization in question, the archive volume can be reset and used in another archive.

Furthermore, in cases where there are few space areas in the archive volumes 5B1 and 5B2, archive processing can also be continued using other archive volumes, as shown in the examples described below.

Moreover, file management areas and data storage area can also be respectively disposed in the respective archive volumes 5B1 and 5B2, and file data can be stored in the data storage areas in a non-rewritable manner, as shown in the examples described below. Furthermore, as shown in the examples described below, first file management information can be stored in the file management area, second file management information can be stored in the data storage area, and the respective sets of file management information can be associated.

Moreover, as is shown in the examples described below, in cases where file data is stored in a plurality of generations, the file names of the file data can be used as directory names, time information discriminating the respective generations can be used as filed names for the data of these generations, and these names can be displayed on the screen of the managing device 3 or the like.

1. First Example

Figure 2:
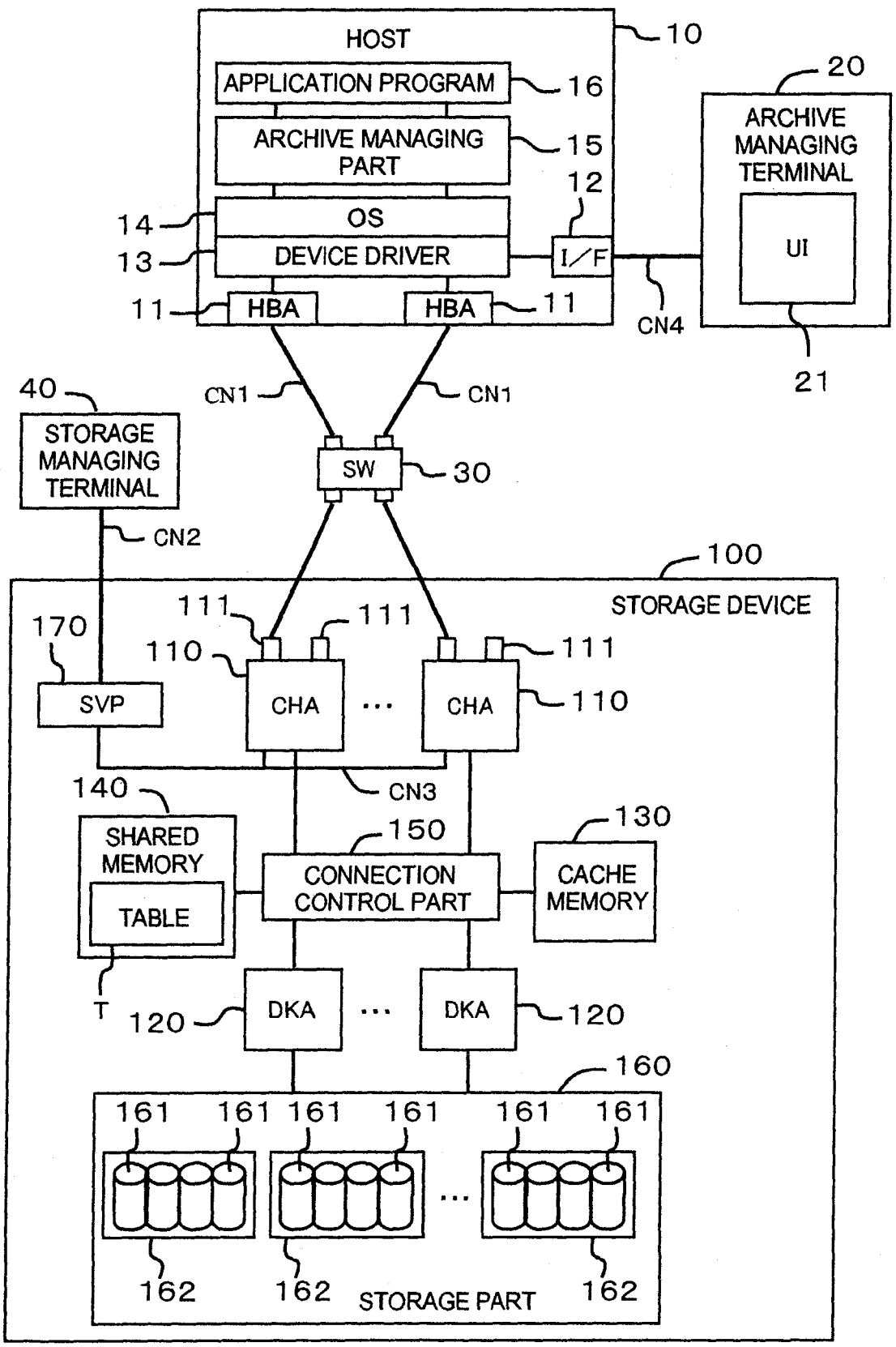
FIG. 2 is an overall structural diagram of the storage system of this embodiment.

FIG. 2 is a block diagram showing an overall outline of the storage system of the present invention. For example, as will be described later (respectively), this storage system can be constructed so that the system comprises a host 10, an archive managing terminal 20, a switch 30, a storage managing terminal 40, and a storage device 100.

For example, the host 10 can be classified as an open type host or a main frame type host. Examples of open type hosts include server machines that mount an all-purpose OS (operating system) such as Windows (registered trademark), UNIX (registered trademark) or the like, and that access the storage device 100 via a relatively all-purpose communications protocol such as FC (Fibre Channel), iSCSI (Internet SCSI), TCP/IP (Transmission Control Protocol/Internet Protocol) or the like. Examples of main frame type hosts include main frame machines that access the storage device 100 via a communications protocol such as FICON (Fibre Connection: registered trademark), ESCON (Enterprise System Connection: registered trademark), ACONARC (Advanced Connection Architecture: registered trademark), FIBARC (Fibre Connection Architecture: registered trademark) or the like.

For example, the host 10 can be connected to the storage device 100 via a communications network CN1, which may include a metal cable or fiber cable, a switch 30 and the like. In the figures, only one host 10 is shown; however, a plurality of hosts 10 may be installed. Furthermore, open type hosts and main frame type hosts may be mixed.

For example, the host 10 can be constructed so that this host 10 comprises one or a plurality of HBA (host bus adapters) 11, a communications interface (hereafter "communications I/F") 12 with the archive managing terminal 20, a device driver program (hereafter "device driver") 13, an OS 14, an archive managing part 15, and an application program (hereafter "application") 16.

Each HBA 11 performs communications with the storage device 100 on the basis of a specified protocol. For example, the communications I/F 12 performs data communications with the archive managing terminal 20 on the basis of a protocol such as TCP/IP or the like.

The device driver 13 controls the respective HBAs 11 and communications I/F 12. For example, the application 16 is an email program or document creation program. The archive managing part 15 manages the archiving of the file data. Further details will be described later; however, the archive managing part 15 stores file data constituting the object of archiving that is created by the application 16 or the like in specified volumes at a specified timing.

For example, the archive managing terminal 20 is connected to the host 10 via a communications network CN4 such as an LAN, the internet or the like. For example, the archive managing terminal 20 comprises a user interface (hereafter "UI") 21 such as a web browser or the like. The system manager or user can indicate the archive execution timing and the like to the archive managing part 15 via the UI 21.

The switch 30 is a relay device that connects the host 10 and the storage device 100. The host 10 and storage device 100 may also be connected without interposing a switch 30. The host 10 and storage device 100 may also be connected via a plurality of switches 30.

The storage managing terminal 40 is a device that is used to collect various types of information regarding the storage device 100 via a service processor (SVP) 170 described later, and to send necessary commands to the storage device 100. For example, the storage managing terminal 40 is connected to the SVP 170 via a communications network CN2 such as an LAN (local area network) or the like. For instance, the storage managing terminal 40 comprises a GUI (graphical user interface) based on a web browser, and can collect various types of information and input commands by logging into a WWW (World Wide Web) server provided by the SVP 170. Furthermore, a construction that manages the state of the storage device 100 from the host 10 may also be used.

For example, the storage device 100 can be constructed so that this storage device 100 comprises a plurality of CHAs 110 (Channel Adapters) 110, a plurality of DKAs (DisK Adapters) 120, a cache memory 130, a shared memory 140, a connection control part 150, a storage part 160, and the abovementioned SVP 170.

A plurality of CHAs 110 can be installed in the storage device 100. The respective CHAs 110 are control packages that control data transfer with the HBAs 111. The respective CHAs 110 can comprise a plurality of communications ports 111, and can be connected with one or more hosts 10. In cases where a plurality of hosts 10 are present, the respective CHAs 110 can individually control data transfer with the plurality of hosts 10.

A plurality of DKAs 120 can be installed in the storage device 100. The respective DKAs 120 are control packages that respectively control data transfer with the storage part 160. For example, the respective DKAs 120 access the respective disk drives 161 by converting logical block addresses (LBA) designed by the host 10 into physical disk addresses, and perform the reading of data or writing of data.

The cache memory 130 stores write data that is written in from the host 10, and read data that is read out to the host 10. For example, the cache memory 130 can be constructed from a volatile or non-volatile memory. In cases where the cache memory 130 is constructed so as to include a volatile memory, it is desirable that memory backup be performed using a battery power supply or the like (not shown in the figures).

For example, the shared memory (also called a "control memory") 140 can be constructed from a non-volatile memory; however, this memory can also be constructed from a volatile memory. For instance, control information, management information and the like are stored in the shared memory 140. This information such as control information and the like can be multiplex-managed by a plurality of memories 140. For example, control information such as which volumes are constructed from which disk drives 161, which volumes can be utilized by which hosts 10 and the like is stored in the table T.

The shared memory 140 and cache memory 130 can be constructed from respectively separate memory packages, or the cache memory 130 and shared memory 140 can be disposed inside the same memory package. Furthermore, a portion of one memory may be used as a cache area, and another portion of the same memory may be used as a control area. In other words, the shared memory and cache memory may be constructed as the same memory or memory group.

The connection control part 150 connects the respective CHAs 110, the respective DKAs 120, the cache memory 130 and the shared memory 140 to each other. As a result, all of the CHAs 110 and DKAs 120 can separately access the cache memory 130 and shared memory 140. For example, the connection control part 150 can be constructed from an ultrahigh-speed cross bar switch or the like.

Furthermore, the CHAs 110. DKAs 120, cache memory 130 and shared memory 140 can be concentrated in one or a plurality of controllers.

The storage part 160 is constructed so that this storage part comprises numerous disk drives 161. The storage part 160 can be installed together with controller parts such as the respective CHAs 110 and respective DKAs 120 or the like inside the same housing, or can be installed in a separate housing from these controller parts.

For example, the storage part 160 can be constructed by mixing a plurality of different types of disk drives 161. In regard to these disk drives 161, for example, FC disks (fibre channel disks), SCSI (small computer system interface) disks, SATA (serial AT attachment) disks, SAS (serial attached SCSI) disks and the like may be used. Furthermore, the types of disks used are not limited to the above; there may be cases in which memory devices comparable to the disk drives shown as examples, or memory device that will be developed in the future, can be used. For example, a construction in which volumes are formed using semiconductor memory devices is also possible.

A plurality of parity groups (also called RAID groups) 162 may be installed in the storage part 160. The respective parity groups 162 are constructed from physical disks 161 of the same type. Specifically, a certain parity group 162 is constructed only from FC disks, while another parity group 162 is constructed only from SATA disks.

Furthermore, one or more logical volumes (also called LDEVs) can be installed in the logical storage areas respectively provided by the respective parity groups 162. By causing these logical volumes to correspond to LUs (logical units), the open type host 10 can recognize and utilize these volumes as physical memory devices. Furthermore, the volumes that are the object of access of the open type host 10 are LUs; however, the object of access of a main frame type host consists of logical volumes (LDEVs).

The memory resources used by the storage device 100 need not all be present inside the storage device 100. The storage device 100 can also incorporate and utilize memory resources of other storage devices located outside the storage device 100 as though these resources were its own memory resources.

For example, the SVP 170 is connected the respective CHAs 110 via an internal network CN3 such as an LAN or the like. The SVP 170 can also detect the states of the respective DKAs 120 by accessing the shared memory 140 via the CHAs 110. The SVP 170 collects various states inside the storage device 100, and provides these states to the storage managing terminal 40, either "as is" or following processing. Furthermore, the SVP 170 can also register data input from the storage managing terminal 40 in the table T inside the shared memory 140.

Figure 3:
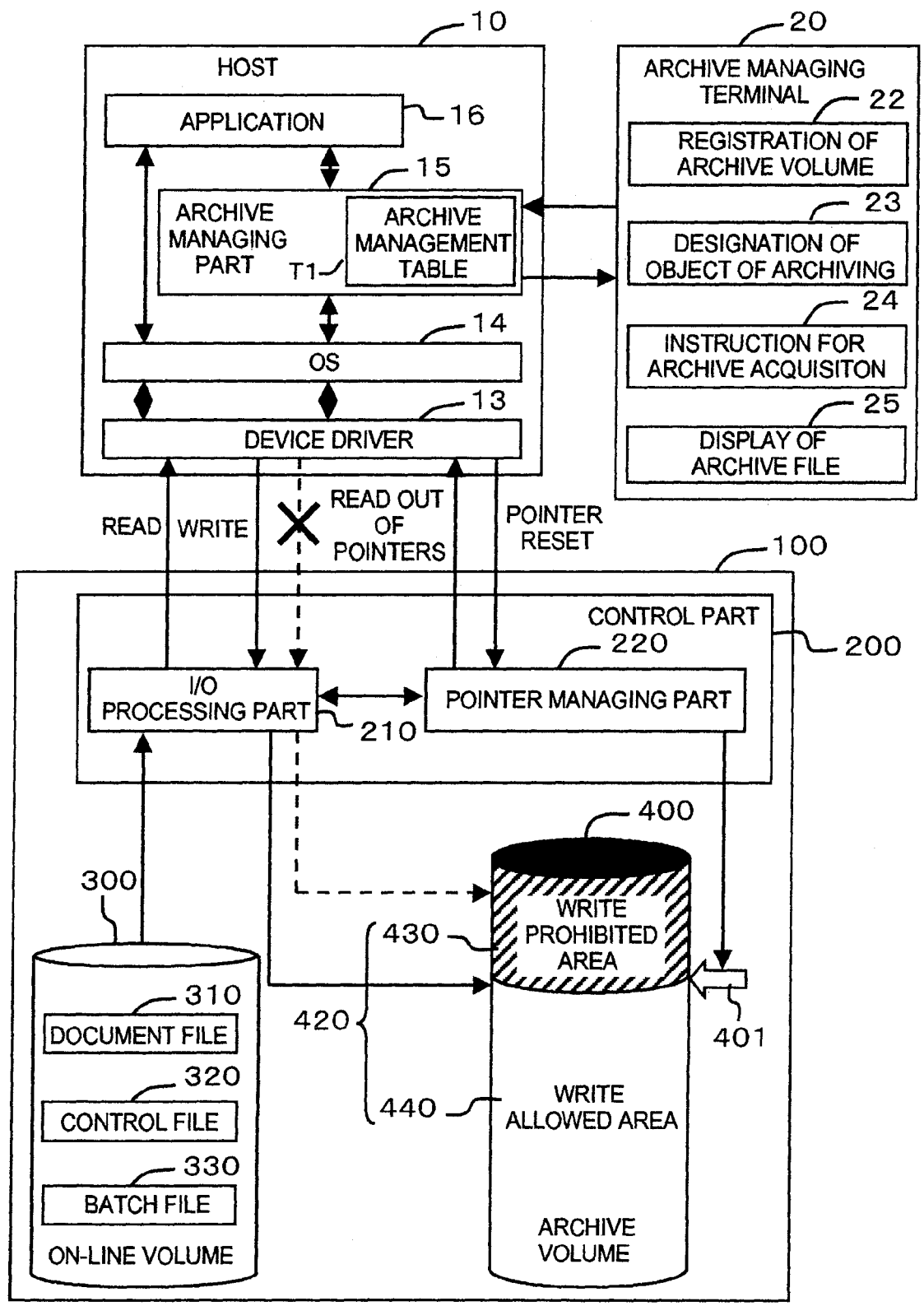
FIG. 3 is an explanatory diagram showing the functional construction of the storage system.

FIG. 3 is schematic structural diagram focusing on the main construction of the storage system. For example, the storage device 100 can comprise a control part 200, an on-line volume 300, and an archive volume 400.

The control part 200 controls the overall operation of the storage device 100; in concrete terms, for example, this part concentrates the control functions of the respective CHAs 110 and the respective DKAs 120. The control part 200 can comprise an I/O processing part 210 and a pointer managing part 220.

The on-line volume 300 is a volume that is utilized by the application 16, and can respectively store various types of files 310 through 330. The document files 310 are files that are created by the user, such as documents, drawings and the like. The control files 320 are files that are created by the OS 14 of the host 10 or the like, such as (for example) construction setting files, installation history files and the like. The batch job files ("batch files" in the figures) 330 are files that are created by batch job programs.

The archive volume 400 is used to store the data of the files stored in the on-line volume 300. Details of the archive volume 400 will be further described later; however, the data storage areas 420 of this volume include write prohibited areas 430 and write allowed areas 440.

The write prohibited areas 430 are storage completed areas in which file data read out from the on-line volume 300 has been stored. The end addresses of the write prohibited areas 430 are managed by write prohibiting pointers 401. The write allowed areas 440 are space areas into which new file data can be written and stored.

Next, the construction of the control part 200 will be described. The I/O processing part 210 separately processes access requests (read requests and write requests) from the host 10 for either the on-line volume 300 or archive volume 400.

In the case of a read request, the I/O processing part 210 reads out data from either the on-line volume 300 or archive volume 400, or both, and stores this data in the cache memory 130 (this is called staging processing). The I/O processing part 210 transmits the staged data to the host 10.

In the case of a write request, the I/O processing part 210 temporarily stores the write data received from the host 10 in the cache memory 130, and immediately notifies the host 10 that the processing of the write request has been completed. Subsequently, the I/O processing part 210 stores the write data stored in the cache memory 130 in a specified position of a specified volume (this is called destaging processing). A system in which the time at which the host 10 is notified of the completion of processing and the time at which writing into the volume is performed are thus different is called an asynchronous system. In contrast, a system in which the host 10 is notified of the completion of processing after the write data received from the host 10 has been written into a specified volume is called a synchronous system. Either of these systems may be used.

In cases where the request is a write request to the archive volume 400, the I/O processing part 210 queries the pointer managing part 220 as to the value of the write prohibiting pointer 401. Then, in cases where the I/O processing part 210 judges that the request is a write request for a write prohibited area 430, for example, the I/O processing part 210 notifies the host 10 that writing is impossible or the like, and excludes such writing.

The pointer managing part 220 manages the write prohibited areas 430 of the archive volume 400. File data that is archived is continuously written without gaps into the archive volume 400 in succeeding order from the head. Then, the value of the end address of the last file data that is written into the archive volume 400 is set as the write prohibiting pointer 401. Accordingly, the range extending from the starting address of the data storage area 420 to the address indicated by the write prohibiting pointer 401 becomes a write prohibited area 430.

The I/O processing part 210 allows the writing of file data into the write allowed areas (also called space areas) 440, but prohibits the writing of file data into the write prohibited areas 430. Furthermore, one or a plurality of sets of file data are continuously written into the archive volume 400 in succeeding order from the head of the volume. Thus, the archive volume 400 is utilized as an add-on type storage volume.

Now turning an eye toward the host 10 and archive managing terminal 20, the archive managing part 15 comprises an archive managing table T1. Details will be described later; however, the archive managing table T1 comprises information that is used to manage the archive timing and the like, and is stored in a memory device belonging to the host 10. By referring to the archive managing table T1, the archive managing part 15 reads out file data that is the object of archiving from the on-line volume 300, and stores this file data in the archive volume 400.

The archive managing terminal 20 respectively realizes a plurality of functions 22 through 25 via the UI 21. In archive volume registration processing 22, for example, the volumes that are to be used in archiving are selected and registered in the archive managing part 15. For instance, the archive object designation processing 23 indicates the files that are to be archived to the archive managing part 15. Furthermore, for example, the archive acquisition indication processing 24 indicates the storage of the designated file data in the archive volume 400 to the archive managing part 15. The archive file display processing 25 causes information relating to the file data stored in the archive volume 400 to be read out by the archive managing part 15, and causes this data to be displayed on the terminal screen of the archive managing terminal 20.

When archiving is performed, the archive managing part 15 acquires the value of the write prohibiting pointer 401 from the pointer managing part 220. Then, the archive managing part 15 reads out the specified file data from the on-line volume 300, and writes this read-out data into a space area 440 of the archive volume 400.

Figure 4:
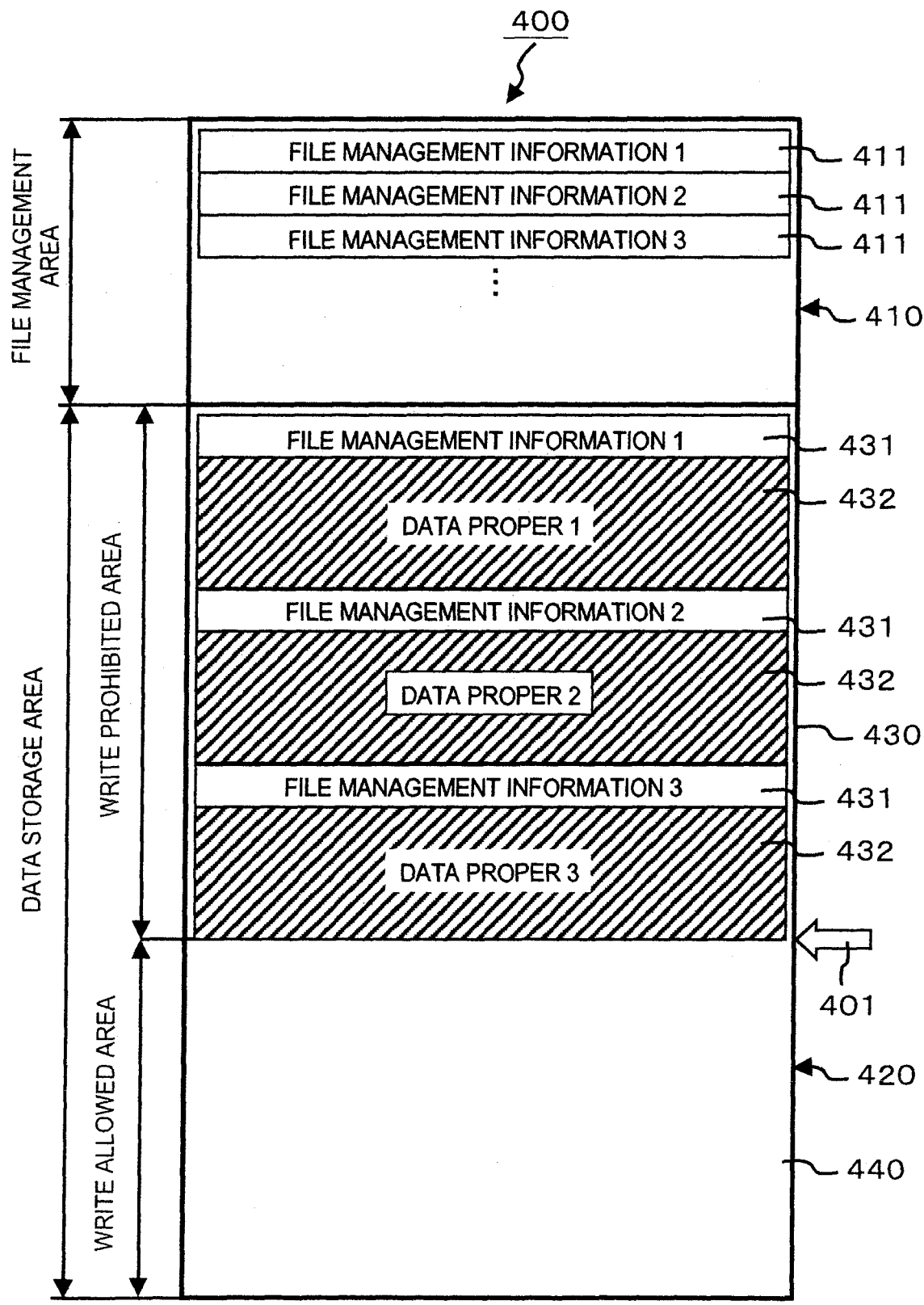
FIG. 4 is an explanatory diagram which shows in model form the structure of an archive volume.

Details of the archive volume 400 will be described with reference to FIGS. 4 and 5. FIG. 4 is an explanatory diagram which shows the overall construction of the archive volume 400 in model form. For example, he archive volume 400 can be divided into a file management area 410 and a data storage area 420.

The file management area 410 stores file management information 411 relating to the file data that is stored in the data storage area 420. The file management information 411 can be rewritten in the file management area 410. In cases where new file data is written into the data storage area 420, file management information 411 relating to this file data is written into the file management area 410. Furthermore, in cases where file data stored in the data storage area 420 is overwritten, the file management information 411 relating to the overwritten old file data can be deleted or overwritten, and new file management information 411 can be stored.

The data storage area 420 is an area that is used for the writing of file data. A plurality of sets of file data can be continuously stored in a non-rewritable manner in the data storage area 420. Areas within the data storage area 420 in which the writing of file data has been completed are managed in a non-rewritable manner as write prohibited areas 430. Unused areas within the data storage area 420 into which file data has not yet been written constitute write allowed areas 440.

The respective sets of file data stored in the data storage area 420 can be divided into file management information 431 and data proper 432. The file management information 431 is constructed from management information relating to the file data. The file management information 431 for the respective sets of file data and the respective sets of file management information 411 stored in the file management area 410 are associated with each other.

Figure 5:
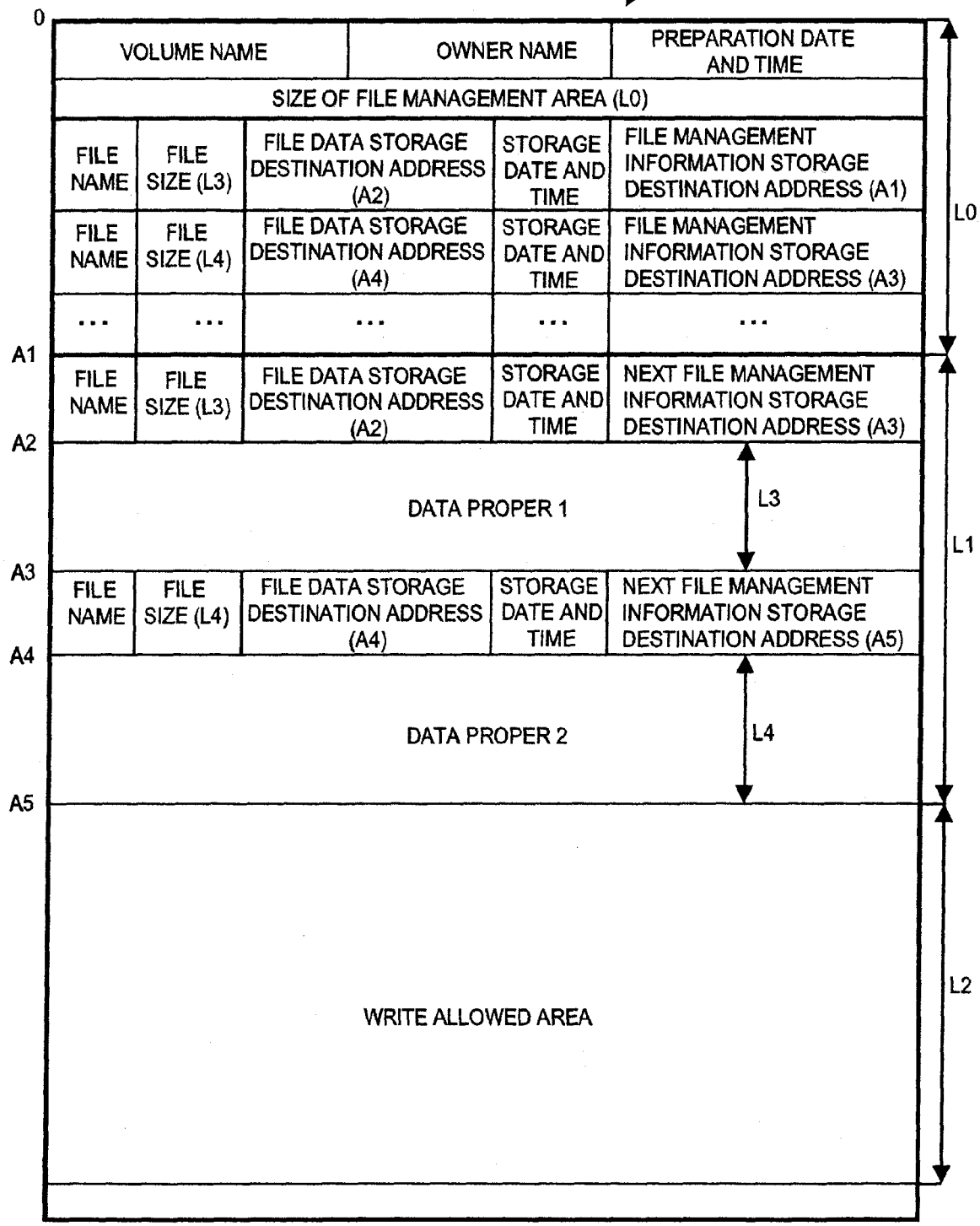
FIG. 5 is a data structural diagram which shows the structure of this archive volume in greater detail.

Reference will now be made to FIG. 5. FIG. 5 is an explanatory diagram showing one example of a more detailed data structure of the archive volume 400.

For example, the volume name of the archive volume 400, the name of the owner of the archive volume 400 and the preparation data of the archive volume 400 can be stored in the head address "0" of the archive volume 400. Following this, the size (L0) of the file management area 410 is stored, and a plurality of sets of file management information 411 are respectively stored in a rewritable manner following this size information.

In other words, the area L0 extending from the head address 0 to the address A1 of the archive volume 400 constitutes a file management area 410. Furthermore, for example, the size (L0) of the file management area 410 is a fixed value that is set with the necessary margin being taken into account beforehand.

For example, the file management information 411 can be constructed so that this information includes the file name, file size, storage destination address of the data proper, date and time of storage in the archive volume 400, and storage destination address of the file management information 431. Accordingly, by referring to the file management information 411, it can easily be ascertained if the object file data is being stored in one of the write prohibited areas 430.

The area from the address A1 on is used as a data storage area 420. First file data is stored in the area extending from the address A1 to the address A3. If this is viewed in detail, file management information 431 for the first file data is stored in the area extending from the address A1 to the address A2. Then, data proper 432 is stored in an area with a size (L3) extending from the address A2 to the address A3.

Next, second file data is stored in the area extending from the address A3 to the address A5. To describe this in greater detail, file management information 431 for the second file data is stored in the area extending from the address A3 to the address A4, and data proper 432 is stored in an area with a size (L4) extending from the address A4 to the address A5.

Here, for example, the file management information 431 stored in the write prohibited area 430 can be constructed so that this information includes the file name, file size, storage address of the data proper, storage date and time, and head address of the next space area.

The head address of the next space area is head address of other file data that is to be stored following the abovementioned file data. The file data is constructed from file management information 431 and data proper 432, and is stored beginning from the file management information 431. Accordingly, the head address of the next space area is the same as the storage destination address of the file management information 431 for the file data that is to be stored next. In other words, the storage destination of the file management information 431 for the file data that is to be stored next can easily be acquired by referring to the file management information 431.

File data is not written into the area from the address A5 on, so that this area constitutes a write allowed area 440.

In the example shown in FIG. 5, the area with a size (L0) extending from head address 0 of the archive volume 400 is a file management area 410 that can be used in a rewritable manner. Following the file management area 410, an area with a size (L1)+size (L2) is used as an add-on type data storage area 420. Within this data storage area 420, an area with a size of (L1) is used as a write prohibited area 430 into which a plurality of sets of file data are written, and an area with a size of (L2) following this is used as a space area.

FIG. 6 is an explanatory diagram showing examples of the constructions of various tables used in archive management. First, FIG. 6 (*a*) shows the archive managing table T1. This archive managing table T1 is created for each archive volume 400. For example, the archive managing table T1 can be constructed by associating the file name or directory name that is set as the object of archiving, the retention term of this data, and the archive timing trigger type.

Here, the file name or directory name that is the object of archiving can be constructed as path information used to access this object of archiving. The retention term, for example, can be designated by the user or system manager as 1 year, 3 years or the like.

For example, the archive timing can be divided into the two main categories of manual starting and automatic starting. Manual starting refers to a case in which archiving is executed by a manual operation performed by the user or system manager. Automatic starting refers to the automatic execution of archiving on a specified predetermined periodic basis such as "daily at noon", "weekly", "end of every month" or the like.

FIG. 6 (*b*) shows the write prohibiting pointer managing table T2. This pointer managing table T2 is used by the pointer managing part 220. For example, the pointer managing table T2 can be constructed by associating the pointer movement date and time, and the value of the write prohibiting pointer 401. Specifically, this pointer managing table T2 can be constructed as a history managing table for the write prohibiting pointer 401. The end address of the data proper 432 is prepared as the value of the pointer 401. A logical block address (LBA) can be use as this address. In cases where history management of the pointer 401 is performed, the most recent write prohibited address alone may be stored instead of the table shown in the figures.

Next, the operation of the storage system will be described with reference to FIGS. 7 through 10. Furthermore, the flow charts described below indicate respective outlines of processing, and are different from the actual programs. Moreover, "step" is abbreviated as "S" below.

Figure 7:
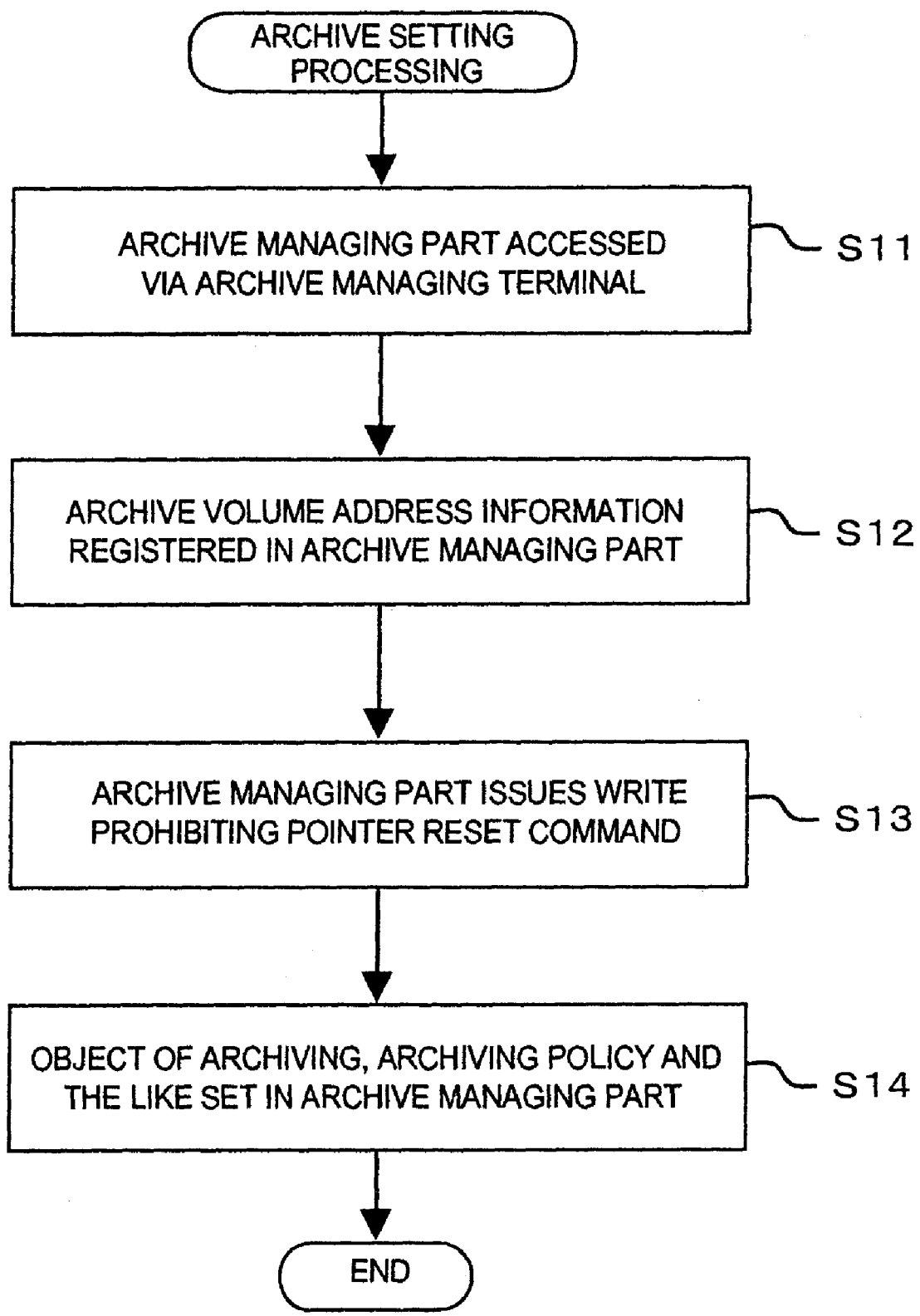
FIG. 7 is a flow chart showing the archive setting processing.

FIG. 7 is a flow chart which shows an outline of the archive setting processing. The system manager accesses the archive managing part 15 via the archive managing terminal 20 (S11). Address information for the volume that is used as the archive volume is registered in the archive managing part 15 (S12).

Next, in accordance with instructions from the system manager, the archive managing part 15 issues a reset command for the write prohibiting pointer 401 to the mounted archive volume 400 (S13). In accordance with this reset command, the control part 200 of the storage device 100 returns the value of the write prohibiting pointer 401 set in the archive volume 400 to "0", and thus resets this value. Furthermore, in cases where a new unused volume is used as the archive volume, the write prohibiting pointer is unset; accordingly, there is no need to issue a reset command in such cases.

Next, the system manager designates the file or directory that is the object of archiving, the archiving policy (type of archive timing) and the like via the archive managing terminal 20, and registers such information in the archive managing table T1 (S14).

Figure 8:
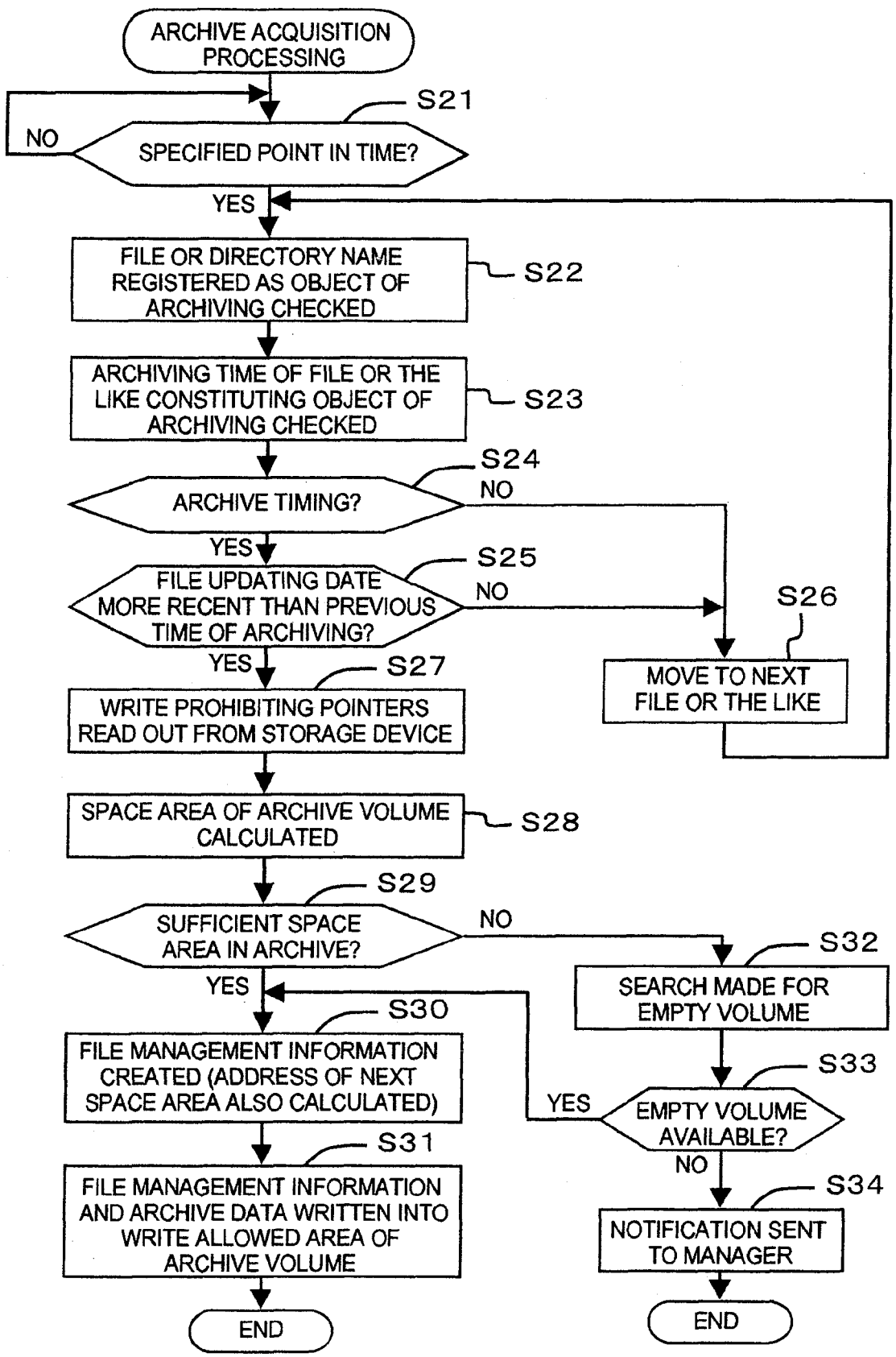
FIG. 8 is a flow chart showing the archive acquisition processing.

FIG. 8 is a flow chart showing the archive acquisition processing. This processing is executed each time that a specified instant in time arrives (S21: YES).

The archive managing part 15 refers to the archive managing table T1, and checks the file name or directory name that is registered as the object of archiving (S22). The archive managing part 15 then checks the archiving period of the file or directory (hereafter referred to as the "file or the like" in some cases) that is the registered object of archiving (S23).

The archive managing part 15 checks whether or not the archiving period (archive timing) of the abovementioned file or the like has arrived (S24). In cases where the archiving period has arrived (S24: YES), the archive managing part 15 judges whether or not the updating date and time of this file or the like is more recent than the updating date and time at the time of the previous archiving (S25). In cases where the updating date and time of this file or the like is more recent than that at the previous archiving (S25: YES), a difference is generated in the file data, so that archiving is meaningful.

On the other hand, in cases where the archiving period set for this file or the like has not arrived (S24: NO), or in cases where the updating date and time of the file or the like matches the previous updating date and time (S25: NO), there is no need to store the data of this file or the like in the archive volume 400. Accordingly, the archive managing part 15 refers to the archive managing table T1, and moves to the next file or the like (S26). Then, the archive managing part 15 repeats the processing of the above-mentioned S22 through S25.

In cases where the archiving period has arrived (S24: YES) and the file or the like has been updated since the previous archive acquisition time (S25: YES), the archive managing part 15 reads out the most recent value of the write prohibiting pointer 401 from the control part 200 of the storage device 100 (S27).

On the basis of the read-out value of the write prohibiting pointer 401, the archive managing part 15 calculates the space area size of the archive volume 400 (S28), and judges whether or not there are sufficient space areas 440 in the archive volume 400 (S29). Thus, since the archive volume 400 is continuously used in succeeding order from the head address, if the initial size of the archive volume 400 is known, the size of the space area 440 can be determined by the value of the write prohibiting pointer 401. Here, the term "sufficient space area" refers to an empty capacity that is equal to or greater than the size of the file data that is the object of archiving.

In cases where a sufficient space area is present in the archive volume 400 (S29: YES), the archive managing part 15 creates file management information 431 for the file data that is the object of archiving (S30). In this case, furthermore, the archive managing part 15 calculates the head address of the space area 440 in which the next file data is to be stored (S30).

Then, the archive managing part 15 continuously writes the file data that is the object of archiving into the space area 440 from the head of the space area 440 (S31). As is shown in both FIGS. 4 and 5, the archive managing part 15 stores the file management information 431 and data proper 432 in the data storage area 420 of the archive volume 400. Furthermore, the archive managing part 15 stores the file management information 411 in the file management area 410.

In cases where a sufficient space area 440 is not present in the archive volume 400 (S29: NO), the archive managing part 15 searches for other utilizable empty volumes (S32). In cases where a utilizable empty volume is discovered (S33: YES), the archive managing part 15 stores the file data in this volume (S30, S31). In cases where a utilizable empty volume cannot be found (S33: NO), the archive managing part 15 notifies the system manager via the archive managing terminal 20 that archiving is impossible due to an insufficient archive volume (S34). For example, the system manager that has received this error notification can prepare archive volumes by adding on disk drives 161 or the like.

Figure 9:
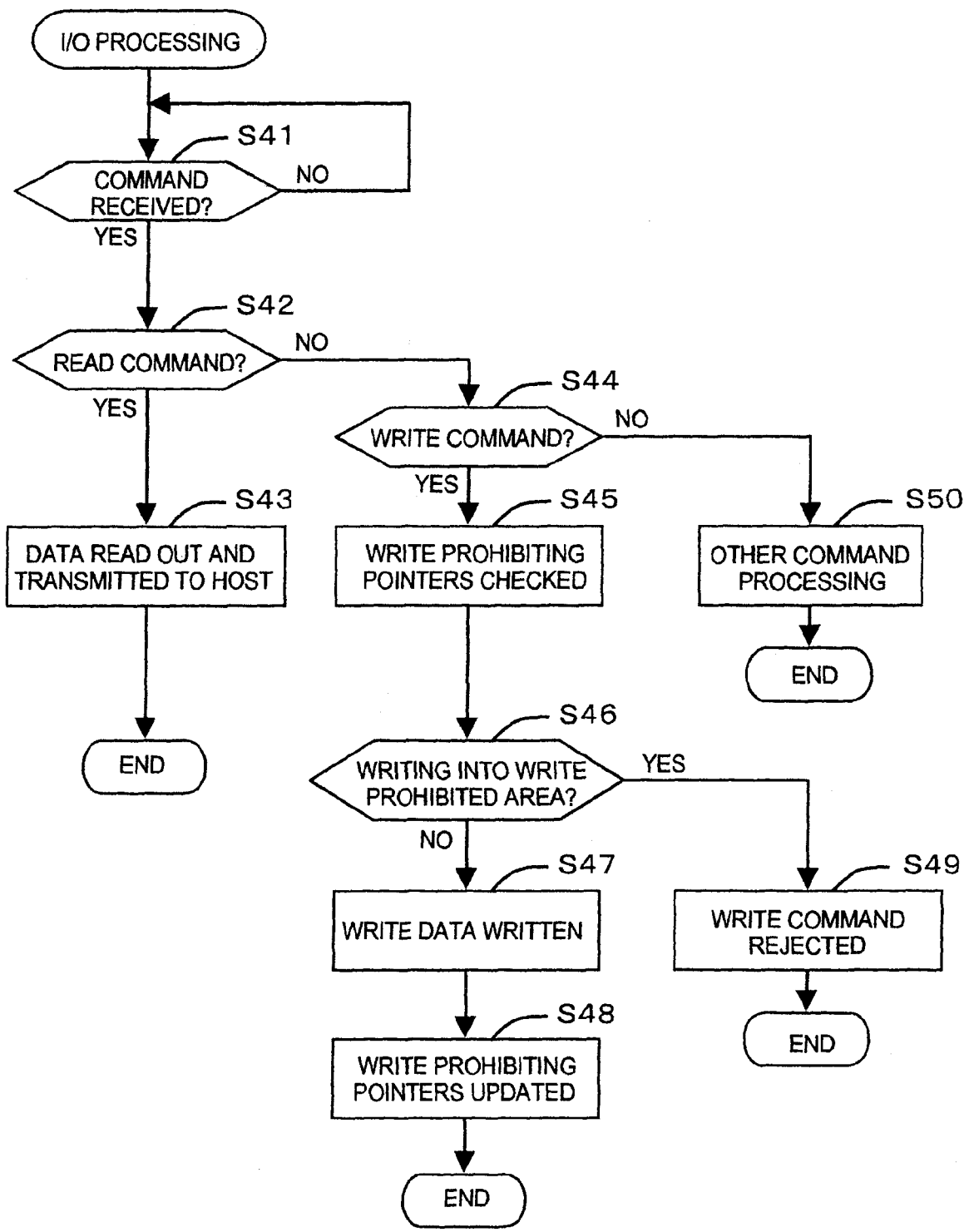
FIG. 9 is a flow chart showing the I/O processing.

FIG. 9 is a flow chart showing the I/O processing that is performed by the control part 200 of the storage device 100. When the control part 200 receives a command from the host 10 (S41: YES), the control part 200 judges whether or not this received command is a read command (S42).

In cases where a read command is received from the host 10 (S42: YES), the control part 200 reads out the requested data from the on-line volume 300, and transmits this data to the host 10 (S43).

In cases where the command received from the host 10 is not a read command (S42: NO), the control part 200 judges whether or not this command is a write command (S44). In cases where a write command is received from the host 10 (S44: YES), the control part 200 checks the value of the write prohibiting pointer 401 (S45), and judges whether or not this is a write command whose object is a write prohibited area 430 (S46). The command received from the host 10 contains address information that is used to specify the object data. Accordingly, the area that is the object of this command can be discriminated by comparing this address information and the value (LBA#) of the write prohibiting pointer 401.

In cases where this writing of data is not the writing of data into a write prohibited area 430 (S46: NO), i.e., in the case of a write command whose object is a space area 440, the control part 200 writes the file data into the space area 440 (S47), and updates the value of the write prohibiting pointer 401 (S48). As was described above, the file data is continuously written in order from the head of the space area 440 without any gaps.

On the other hand, in the case of a write command whose object is a write prohibited area 430 (S46: YES), the control part 200 rejects this write command (S49). For example, the control part 200 notifies the host 10 that writing cannot be performed into the designated volume 400. As a result, the alteration or deletion of the file data already stored in the archive volume 400 can be prevented in advance.

Furthermore, in cases where a command received from the host 10 is neither a read command nor a write command (S44: NO), the control part 200 performs ordinary processing in accordance with this command (S50). For instance, state checking commands and the like may be cited as examples of such commands.

Furthermore, in the abovementioned flow chart, for convenience of description, a judgment is made as to whether or not the command received from the host 10 is a read command, and in cases where this command is not a read command, a judgment is made as to whether or not this command is a write command. In actuality, however, command discriminating information that indicates the type of the command is contained within the command. Accordingly, it can immediately be detected from this command discriminating information whether the command corresponds to a read command, write command or some other type of command.

Figure 10:
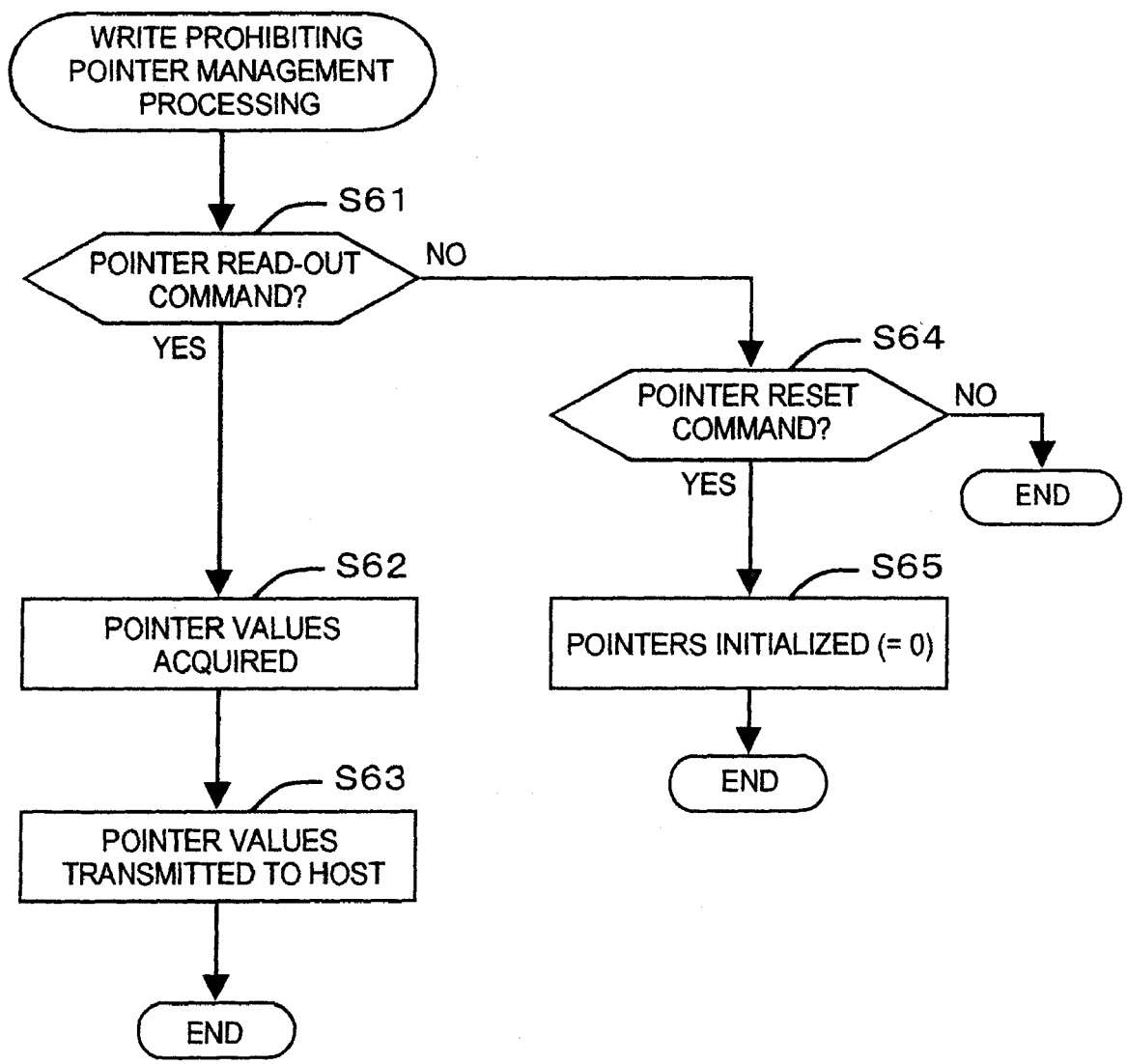
FIG. 10 is a flow chart showing the write prohibiting pointer management processing.

FIG. 10 is a flow chart which shows the write prohibiting pointer management processing. The control part 200 of the storage device 100 judges whether or not read-out of the pointer 401 has been requested by the host 10 (S61).

In cases where read-out of the pointer 401 has been requested by the host 10 (S61: YES), the control part 200 reads out the most recent value of the pointer 401 (S62), and transmits this value to the host 10 (S63).

In cases where the request from the host 10 is not a request for the read-out of the value of the pointer 401 (S61: NO), the control part 200 judges whether or not reset of the pointer 401 has been requested by the host 10 (S64). In cases where reset of the pointer 401 has been requested (S64: YES), the control part 200 resets the value of the pointer 401 to "0" (S65). As a result, the archive volume 400 that is managed by this pointer 401 is initialized, so that new data can be written into this volume.

Figure 11:
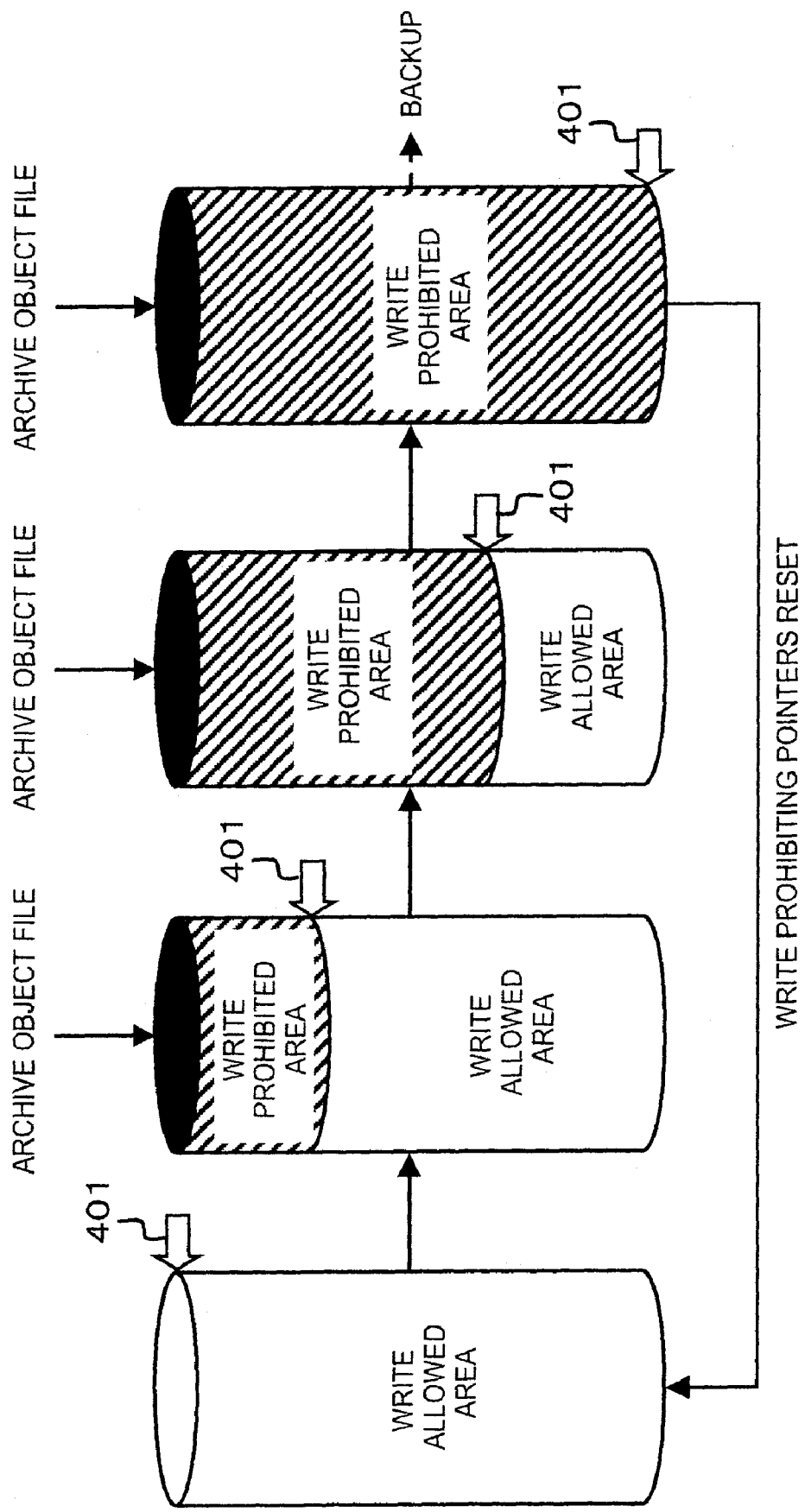
FIG. 11 is an explanatory diagram which shows in model form variations in the conditions of use of the archive volumes.

FIG. 11 is a model diagram which shows the variation in the conditions of utilization of the archive volume 400. FIG. 11 (a) shows the initial state. In the initial state, no file data is stored in the archive volume 400.

As is shown in FIGS. 11 (b) and (c), file data that is the object of archiving is gradually stored in the archive volume 400 as time passes. The value of the write prohibiting pointer 401 is updated each time that file data is written into the archive volume 400. The most recent value of the pointer 401 indicates the end address of the most recent file data written into the archive volume 400.

Eventually, as is shown in FIG. 11 (d), the archive volume 400 reaches a full state. The archive volume 400 in this full state can be left "as is" in the storage device 100. Alternatively, backup of the full archive volume 400 may be obtained on some other memory device such as a tape device or the like.

Furthermore, in cases where the archive volume 400 has become unnecessary, this archive volume 400 can be reutilized as an empty volume by resetting the write prohibiting pointer 401.

As a result of being constructed as described above, the present example offers the following merits. In the present example, the file data of respective files 310 through 330 can be stored sequentially in an archive volume 400 that allows random access. As a result, the archive volume 400 can be utilized as a so-called WORM device. Accordingly, compared to the WORM device of an optical disk medium, file data can be read out at a relatively high speed, so that the convenience of the system is improved.

In the present example, areas in which file data has already been stored are managed as write prohibited areas 430 using a write prohibiting pointer 401. When the host 10 stores file data, the host 10 can acquire the value of the write prohibiting pointer 401 and perform archiving. Accordingly, the archive volume 400 can be used as a WORM device by means of a relatively simple construction.

In the present example, the archive volume 400 in use can be re-utilized by resetting the write prohibiting pointer 401. Accordingly, in cases where there is no longer a need to retain file data, the pointer set in this archive volume can be reset, and the archive volume can be used for other archiving.

In the present example, in cases where there are few space areas 440 in the archive volume 400, a search can be made for other archive volumes, and archive processing can be performed using other archive volumes that are thus found. Accordingly, the convenience of the system is improved.

In the present example, a file management area 410 and data storage area 420 are respectively disposed in the archive volume 400, and file data is stored in the data storage area 420 in a non-rewritable manner. Furthermore, a construction is used in which first file management information 411 is stored in the file management area 410, second file management information 431 is stored in the data storage area 420, and these respective sets of file management information 411 and 431 are associated. Accordingly, the control part 200 can easily grasp what type of file data is stored in which area of the volume 400 merely by accessing the file management area 410. Furthermore, even if by some chance all or part of the data in the file management area 410 should be lost, the file management information 411 can be restored on the basis of the file management information 431 in the data storage area 420, so that the reliability is improved.

2. Second Example

A second example will be described with reference to FIGS. 12 through 26. In this example, files that are the object of archiving are classified beforehand, and the system is devised so that archiving is performed automatically with the archive period defined for each type of file. Furthermore, in this example, the archive volume is recycled using a plurality of write prohibiting pointers. This example corresponds to a modification of the first example, and all or part of the construction described in the first example may be cited if necessary.

Figure 12:
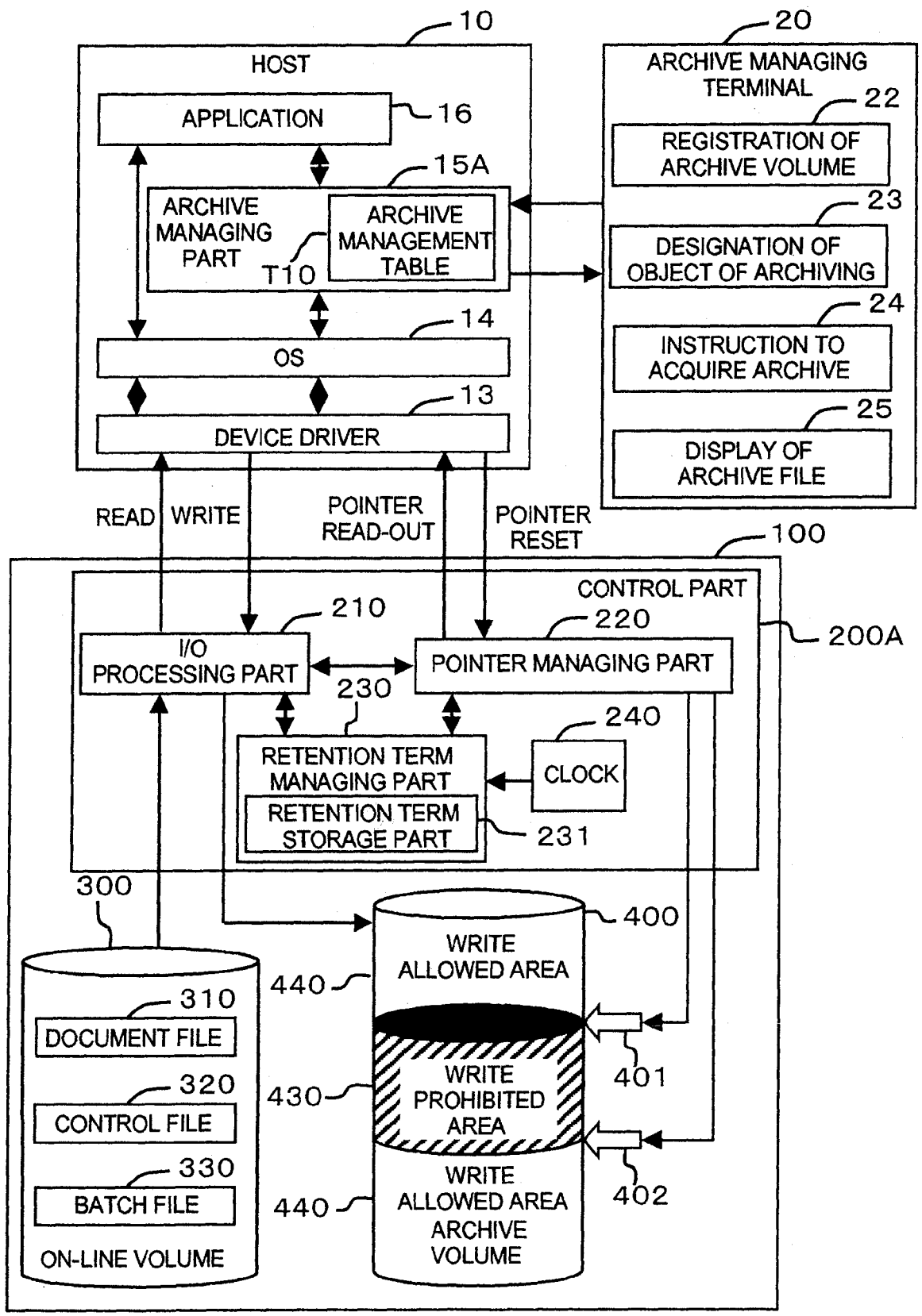
FIG. 12 an explanatory diagram showing the functional construction of a storage system constituting a second embodiment of the present invention.

FIG. 12 is a block diagram which shows the main construction of the storage system in schematic form. As in the first example, this storage system comprises a host 10, an archive managing terminal 20, and a storage device 100. The storage system of the present example comprises all of the construction described with reference to FIG. 2; here, a redundant description is omitted.

The host 10 can be constructed so that this host 10 comprises a device driver 13, an OS 14, an archive managing part 15A, and an application 16. The archive managing part 15A can utilize an archive management table T10.

The storage device 100 comprises a control part 200A. The control part 200A can be constructed so that this control part 200A comprises an I/O processing part 210, a pointer managing part 220, a retention term managing part 230, and a clock 240.

The pointer managing part 220 manages the write prohibited areas 430 using a plurality of write prohibiting pointers 401 and 402. The first write prohibiting pointer (hereafter referred to as the "first pointer") 401 specifies the head address of the write prohibited area 430. The second write prohibiting pointer (hereafter referred to as the "second pointer") 402 specifies the end address of the write prohibited area 430. Accordingly, the write prohibited area 430 is managed as an area that extends from the address indicated by the first pointer 401 to the address indicated by the second pointer 402.

The retention term managing part 230 manages whether or not the retention terms of the respective sets of file data stored in the archive volume 400 have expired. The retention term managing part 230 respectively manages the dates on which the respective sets of file data were stored in the archive volume 400 by means of an archive data management table T3 (FIG. 13) stored in the retention term storage part 231, and clock information from the clock 240.

Specifically, for the respective sets of file data stored in the archive volume 400, the retention term managing part 230 manages whether or not the time elapsed from the storage of the file data has reached the retention term set for the archive volume 400 (i.e., the retention term set for the file data).

Figure 13:
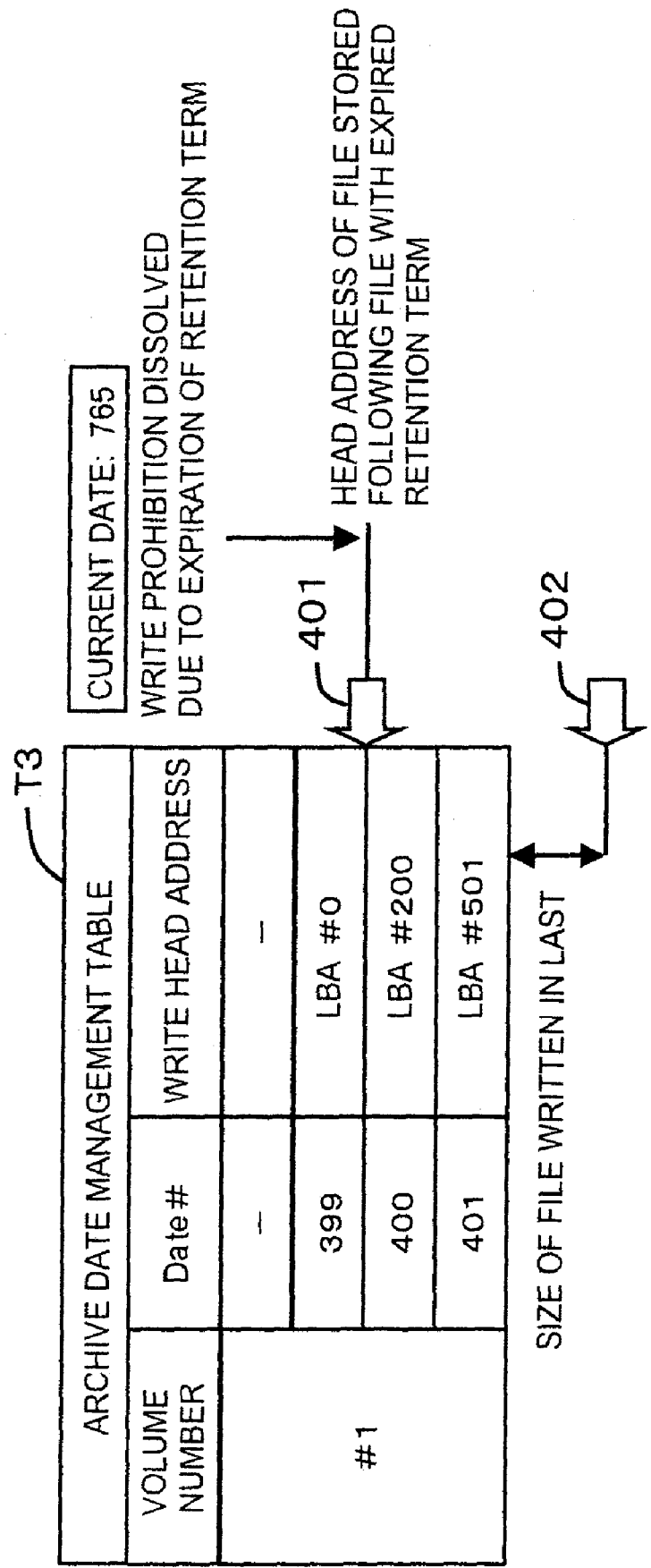
FIG. 13 is an explanatory diagram showing an archive data managing table and a pointer management method using this table.

FIG. 13 is an explanatory diagram showing one example of the archive data management table T3. This table T3 is used to manage the dates on which respective sets of file data were stored in the archive volume 400, and the head addresses of the respective sets of file data (in correspondence with each other). The archive data management table T3 manages the respective sets of file data stored in the respective archive volumes for each archive volume. In FIG. 13, the conditions of management for a single archive volume are shown; however, a plurality of archive volumes can be respectively managed by adding volume numbers.

The archive management table T3 can be used for a plurality of purposes. The first purpose is to determine whether or not the retention term of given file data has expired. In order to achieve this object, the dates on which respective sets of file data were stored in the archive volume (hereafter also referred to as "registration dates") are respectively stored in the management table T3.

A judgment can be made as to whether or not the term for which given file data is to be retained has ended by counting the number of days elapsed from the registration date (Date#). Information relating to "dates" such as the registration data and number of days elapsed can be obtained by various methods. In the present example, a clock 240 is used in which the output value (date code) is increased by 1 every day.

If the output value of the clock 240 at the start of operation is set at "0", then the clock 240 will output "1" on the following day, and will output "7" after one week. Accordingly, the number of days elapsed from the storage of the file data in the archive volume can be determined by comparing the current data code with the date code for the date on which this file data was stored.

For instance, in a case where the current date code is "765" and the registration data of a certain set of file data is "399", the number of days elapsed for this file data is 366 days (=765−399). In a case where "365 days" is designated as the retention term of this file data, i.e., in a case where the archive volume in which this file data is stored is a volume used for 1 year retention, the prohibition on writing onto file data for which the number of elapsed days has reached 366 days can be released.

The control part 200A releases the prohibition on writing onto file data whose retention term has expired by updating the value of the first pointer 401 to the head address ("LBA #200" in FIG. 13) of the file data that is to be stored next after the file data whose retention term has elapsed. Thus, the registration dates (archive dates) of the respective sets of file data present in the respective archive volumes can be individually grasped, so that it can easily be ascertained whether or not the retention terms of the respective sets of file data have expired. Furthermore, by moving the first pointer 401 to the head of the file data that is to be stored next after the file data whose retention term has expired, it is possible to release the prohibition of writing onto the file data whose retention term has expired, so that this area can be re-utilized as a space area.

The second purpose of the archive date management table T3 is to manage the respective write prohibiting pointers 401 and 402. In order to achieve this object, the head addresses of the sets of file data are stored in the management table T3. The value of the first pointer 401 which specifies the starting position of the write prohibited area 430 coincides with the head address of the file data having the oldest registration date within the archive volume. The value of the second pointer 402 which specifies the end position of the write prohibited area 430 coincides with the end address of the file data having the most recent registration date within the archive volume. Furthermore, the sizes of the respective sets of file data can be determined by comparing the head addresses of adjacent sets of file data.

Thus, the values of the respective pointers 401 and 402 can be respectively grasped by managing the head addresses of the respective sets of file data stored in the respective archive volumes by means of the management table T3. As a result, furthermore, variations in the values of the respective pointers 401 and 402, i.e., the movement histories of the respective pointers 401 and 402, can be managed at the same time.

Thus, the archive data management table T3 simultaneously realizes a plurality of purposes by storing the dates (date #) on which the respective sets of file data were stored in the archive volume and the head addresses in association with each other. Furthermore, if similar purposes can be achieved, a plurality of different tables may be used.

FIG. 14 is an explanatory diagram which shows one example of the archive management table T10 used by the archive managing part 15A. This management table T10 is used to manage the archive timing for each type of file 310 through 330 stored in the on-line volume 300. For example, the archive management table T10 can be constructed from a plurality of sub-tables T11 through T13 respectively corresponding to the types of files 310 through 330.

The user document type archive management table (hereafter referred to as the "user document type table") T11 manages the archiving of files 310 belonging to the user document type among the respective files 310 through 330 stored in the on-line volume 300. The user document type refers to a type of file that is prepared by the user, and whose archive period is to be determined by the user. For instance, document files, drawing files, image files, voice files and the like may be cited as examples of files 310 belonging to the user document type.

Files 310 belonging to the user document type are retained for an arbitrary number of days according to the judgment of the user who is the preparer of the file. Specifically, files 310 belonging to the user document type have an arbitrary or aperiodic nature with respect to archive management. More concretely, for example, such files 310 may be stored in the archive volume each time that a revised edition is prepared, and the time of completion of the revised edition is not known to anyone but the preparer.

Accordingly, in the user document type table T11, the table is constructed by associating file path information that is used to specify the file or the like that is the object of archiving, and the retention term for which this file or the like that is the object of archiving is to be protected. The user document type table T11 can be constructed without including timing information relating to automatic archiving.

The control file type archive management table (hereafter referred to as the "control file type table") T12 manages the archive timing of files 320 belonging to the control file type among the respective files 310 through 330 stored in the on-line volume 300. The control file type refers to (for example) types of files that are used for the control of the host 10, such as system files and construction setting files used by the OS 14, installation history files and the like.

The control files 320 are to be periodically retained in the archive volume, and have a periodic nature with respect archive management. Accordingly, the control file type management table T12 is constructed by associating file path information used to specify files or the like that are the object of archiving, the retention terms of these files or the like, and the archive timing that is used to perform automatic archiving. For example, this archive timing can be appropriately set by the system manager in accordance with the nature of the control files 320 and the archiving policy, as "daily", "weekly", "end of the month" or the like.

The batch job file type archive management table (hereafter referred to as the batch job file type table") T13 manages the archiving of files belonging to the batch job file type among the respective files 310 through 330 stored in the on-line volume 300. The batch job file type refers to files that are created by batch job programs. These batch job file type files 330 can be automatically stored in the archive volume at the point in time that updating is completed. In common with user document file type files, these files have no periodicity; on the other hand, in common with files of the control file type, these files allow automatic archiving.

The batch job file type table T13 can be constructed by associating file path information used to specify the file or the like that is the object of archiving, and the retention terms for these files or the like. This management table T13 does not require the setting of an automatic archive period. The reason for this is that it is sufficient to perform archiving at the point in time at which the object batch job files 330 are updated.

Figure 15:
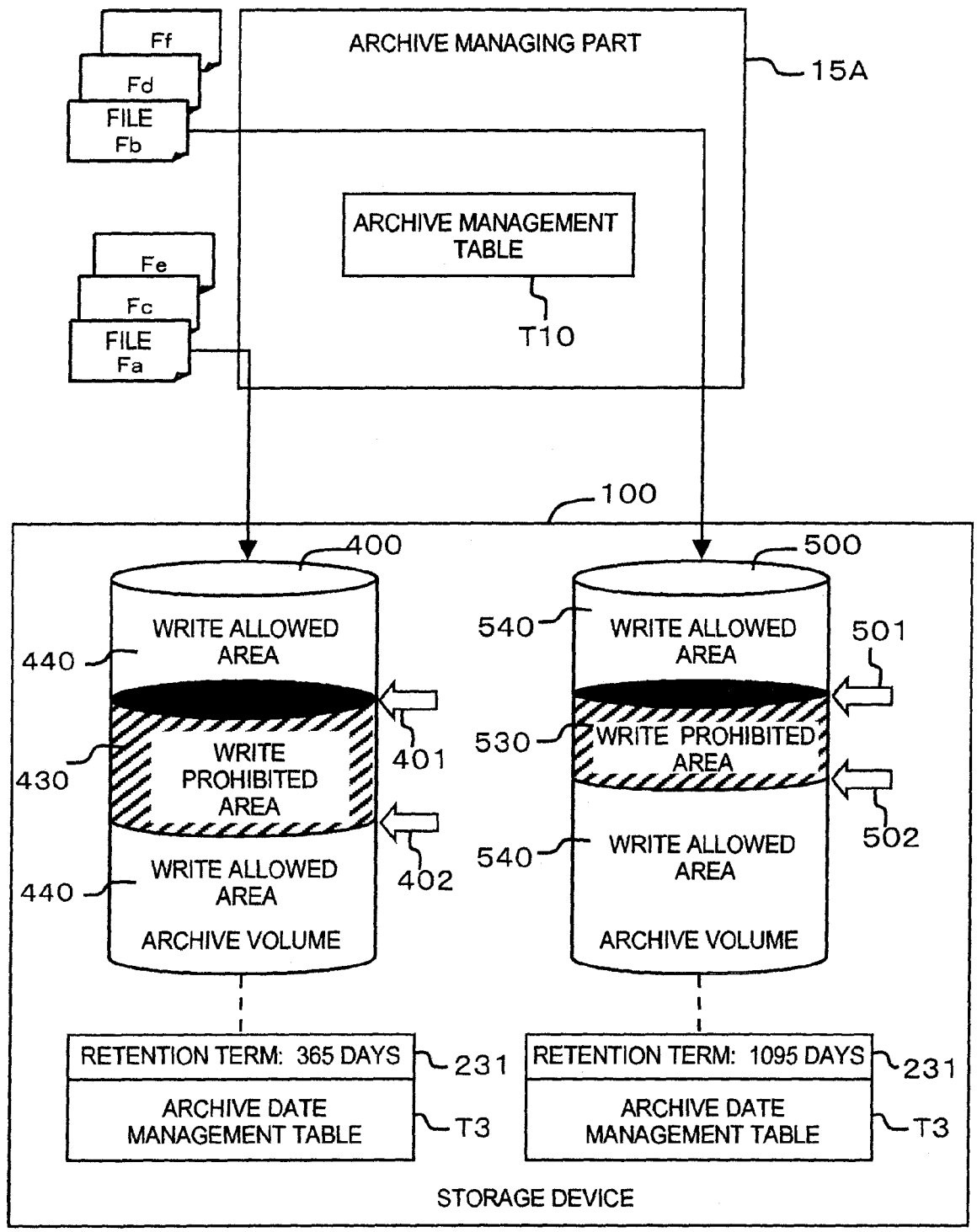
FIG. 15 is an explanatory diagram which shows in model form the conditions of archiving.

FIG. 15 is an explanatory diagram which shows an outline of the archive processing of the present example in model form. The archive managing part 15A manages archiving for a plurality of respectively different types of files Fa, Fb, Fc, Fd, Fe and Ff.

For example, these respective files Fa through Ff belong to the user document type, control file type, batch job file type or the like. Furthermore, the retention terms may be different even in the case of files that belong to the same type. For example, one retention term is 365 days (one year). Another retention term is 1095 days (3 years). Fa and Fb, Fc and Fd, and Fe and Ff, respectively belong to the same file type, but are files for which mutually different retention terms are set.

In FIG. 15, file that are retained for 365 days are Fa, Fc and Fe, and files that are retained for 1095 days are Fb, Fd and Ff. The files Fa, Fc and Fe are stored in an archive volume 400 for which a retention term of 365 days is set beforehand. The files Fb, Fd and Ff are stored in another archive volume 500 for which a retention term of 1095 days is set beforehand. The times at which the respective files Fa through Ff are stored in a specified archive volume differs according to the respective file type. The user document type files Fa and Fb are respectively stored in a specified archive volume according to a timing designated by the user. The files Fc and Fd of the control file type are respectively stored in a specified archive volume at a specified period set by the system manager. The files Fe and Ff of the batch job file type are respectively stored in a specified archive volume automatically at the point in time at which the files are updated.

In the case of the archive volume 400, the beginning and end of the write prohibited area 430 are respectively managed using a first pointer 401 and second pointer 402. Similarly, in the case of the archive volume 500, the beginning and end of the write prohibited area 530 are respectively managed using a first pointer 501 and second pointer 502.

Furthermore, the archive dates and head addresses of the file data written into the archive volume 400 are managed by means of the archive management table T3. Similarly, the archive dates and head addresses of the file data written into the archive volume 500 are also managed by means of the archive management table T3.

Among the respective sets of file data stored in the archive volume 400, file data for which the number of days elapsed since the data was stored in the archive volume has reached 365 days does not require further retention. Accordingly, the areas in which file data whose retention term has expired is stored are released as write allowed areas 440. Specifically, the first pointer 401 is moved to the head address of the file data that is to be stored next after the file data whose retention term has expired.

Meanwhile, in cases where new file data whose retention term is set at 365 days is stored in the archive volume 400, this file data is continuously written in the space area 440 that follows the write prohibited area 430. Accordingly, as time passes, the write prohibited area 430 successively moves through the archive volume 400. The write prohibited area 430 moves in the direction in which the addresses inside the volume grow larger.

Similarly, in the other archive volume 500 as well, space areas 540 are respectively positioned on both sides of the write prohibited area 530, and the write prohibited area 530 moves through the archive volume 500 as time passes.

Thus, the archive managing part 15A stores the file data in an archive volume for which a retention term that matches the retention term set for the file data has been set, at a timing corresponding to the type of this file data. Furthermore, the archive managing part 15A dissolves the prohibition on writing into areas in which file data whose retention term has ended is stored, and releases these areas as space areas. As a result, the write prohibited area moves through the archive volume, so that the archive volume is re-utilized in a cyclical manner.

Of course, in cases where the size and writing frequency (archiving frequency) of the file data are large compared to the size of the archive volume, so that there is no balance between the size of the file data that is written and the size of the areas that are released, the archive volume will become full. In such cases, for example, the size of the archive volume can be set, or the archiving frequency can be adjusted, so that a good match is obtained between the size of the file data that is written and the size of the areas that are released.

In the present example, since the archive volume is re-utilized in a cyclical manner, the file management information that is stored in the file management area is frequently rewritten. Even in cases where by some remote chance the file management area is damaged as a result of this frequent rewriting, the file management area can be restored by means of the file management information stored in the data storage area.

Figure 16:
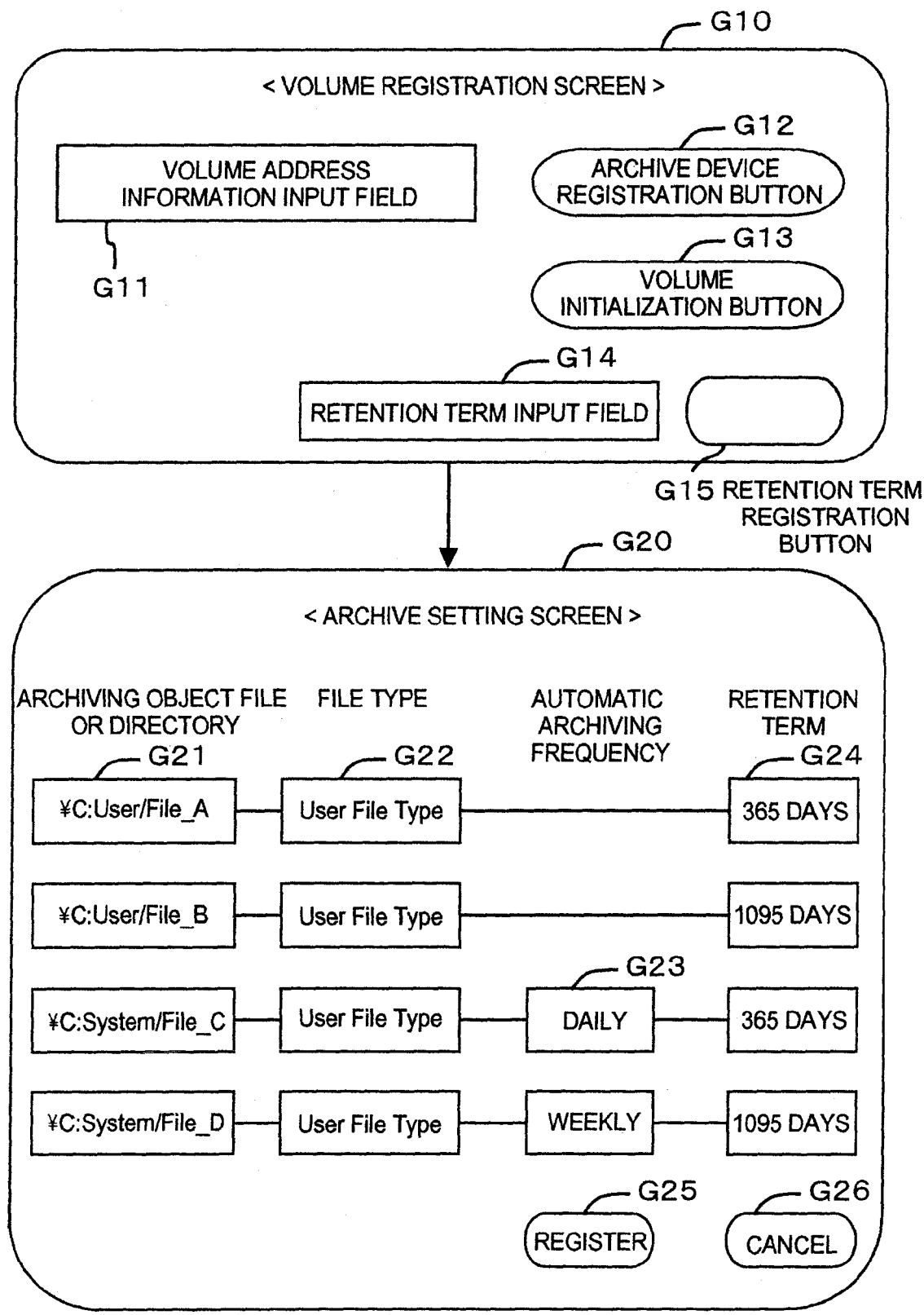
FIG. 16 shows examples of the screens provided on the archive managing terminal by the archive managing part, with the archive volume registration screen, and the screen used to set the archiving conditions.

FIG. 16 is an explanatory diagram which shows one example of the setting screen used to perform archive management. The volume registration screen G10 is shown on the upper side of FIG. 16, and the archive setting screen G20 is shown on the lower side of FIG. 16.

The volume registration screen G10 is used to register the volumes used for archiving. For example, this screen G10 may include an address information input field G11, an archive device registration button G12, a volume initialization button G13, a retention term input field G14, and a retention term registration button G15.

Address information that is used to specify the volume for which use as the archive volume is planned or the archive volume for which initialization is planned is input into the address information input field G11 by the system manager. This address information need not be full path information, as long as this information is sufficient to specify the volume. Accordingly, for example, designation by means of the volume number, volume nickname or the like is also possible. Furthermore, for example, all utilizable volumes may be displayed in a list, and the user may select from these volumes.

The archive device registration button G12 is a button that is used by the system manager to give approval regarding the use of the volume specified by means of the address information input field G11 as the archive volume. The volume initialization button G13 is a button that initializes the volume specified by the address information input field. Operation of the initialization button G13 causes the values of the write prohibiting pointers associated with this volume to be reset.

In the retention term input field G14, a specified retention term is set by the system manager for the volume specified by the address information input field G11. A construction may be used in which plurality of retention terms that can be set are prepared beforehand, and one retention term is selected from these; alternatively, a construction may be used in which an arbitrary term can be input. The retention term registration button G15 is a button used by the system manager to request registration of the retention term input using the retention term input field G14.

Next, the archive setting screen G20 will be described. For example, the archive setting screen G20 may include an address information input field G21, a file type designation field G22, an automatic archiving frequency input field G23, a retention term input field G24, a registration button G25, and a cancel button G26.

In the address information input field G21, the system manager or user specifies the file or directory that is the object of archiving. In the file type designation field G22, the system manager designates the type to which this file or the like belongs. For instance, the three types of user document type, control file type and batch job file type may be cited as file types.

In the automatic archiving frequency input field G23, the system manager or the like inputs the period at which the file or the like that is the object of archiving is stored in the archive volume. Here, the automatic archiving frequency input field G23 is associated only with files or the like that require such a field. In the case of files or the like that are designated as the user document type, the automatic archiving frequency input field G23 does not appear. The reason for this is that the archiving time for files of the user document type is determined by the wishes of the user. Similarly, in the case of files of the batch job file type as well, the automatic archiving frequency input field G23 does not appear. As a result, the input of values (automatic archiving frequency values) that cannot be set for such files or the like can be prevented in advance, so that the operability of the system can be improved.

In the retention term input field G24, the term for which the file or the like is to be retained is input by the system manager or the like. For example, in cases where the retention term differs according to the attributes of the file, a construction may be used in which information indicating the attributes of the file is acquired, and a retention term corresponding to this attribute information is automatically set. For instance, in cases where it is discriminated by means of an expander that the file is email, the value designated beforehand as the retention term for email can be automatically input into the retention term input field G24.

Furthermore, the registration button G25 is a button that prompts the registration of the information input into the respective fields G21 through G24. The cancel button G26 is a button that requests cancellation of the information input into the respective fields G21 through G24.

Figure 17:
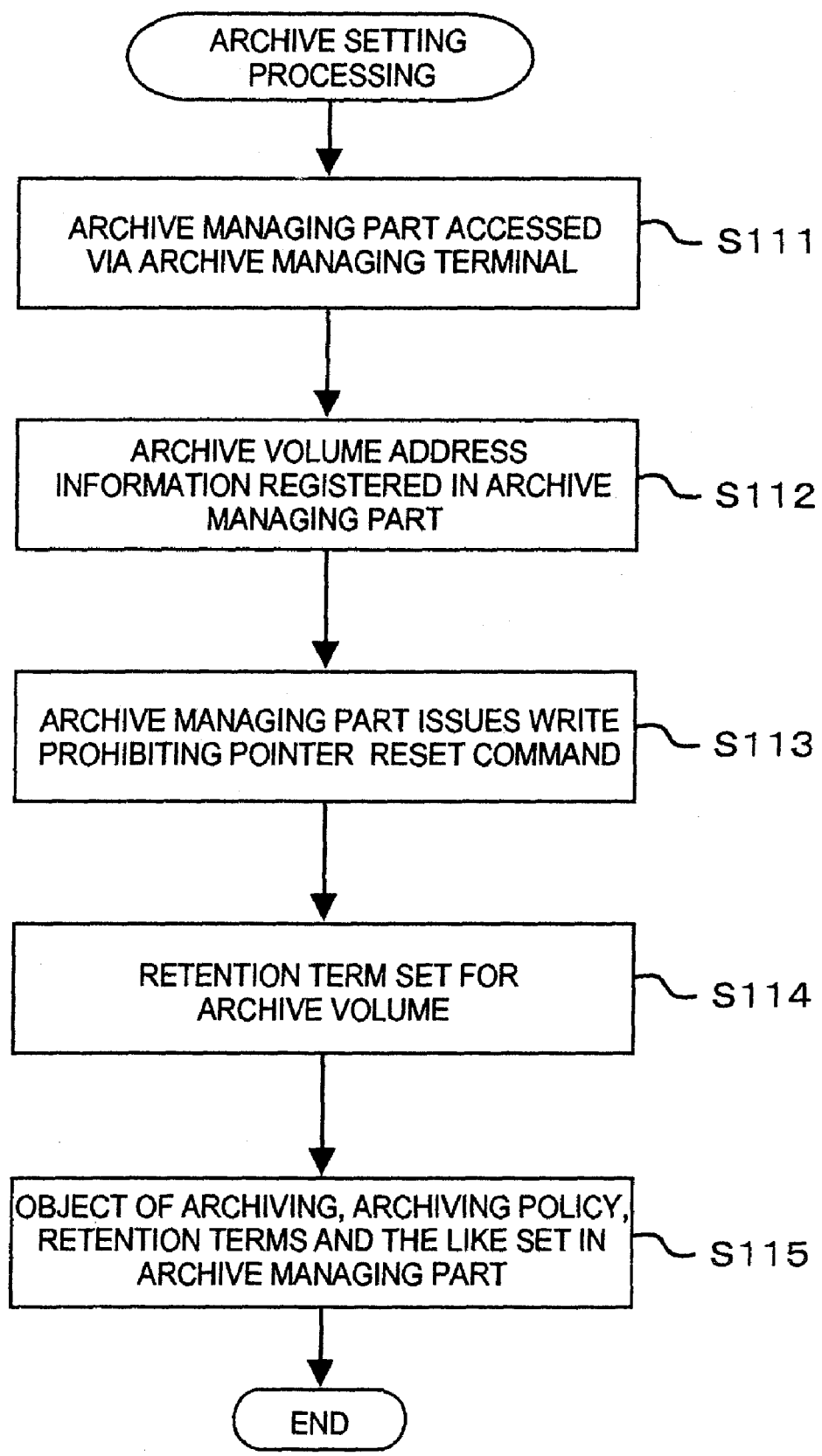
FIG. 17 is a flow chart showing the archive setting processing.

Next, the operation of the storage system will be described. FIG. 17 is a flow chart showing an outline of the archive setting processing.

The system manager accesses the archive managing part 15A via the archive managing terminal 20 (S11), and registers address information for the volume used as the archive volume in the archive managing part 15A (S112). Next, the archive managing part 15A issues a reset command to the archive volume to reset the write prohibiting pointers (S113). As a result, the control part 200A respectively resets the values of the first pointer and second pointer set for the archive volume 4.

The system manager sets the retention term for the registered archive volume (S114). Next, the system manager designates the file or directory that is the object of archiving, the archiving policy and the like, and registers this information in the archive management table T10 (S115).

Figure 18:
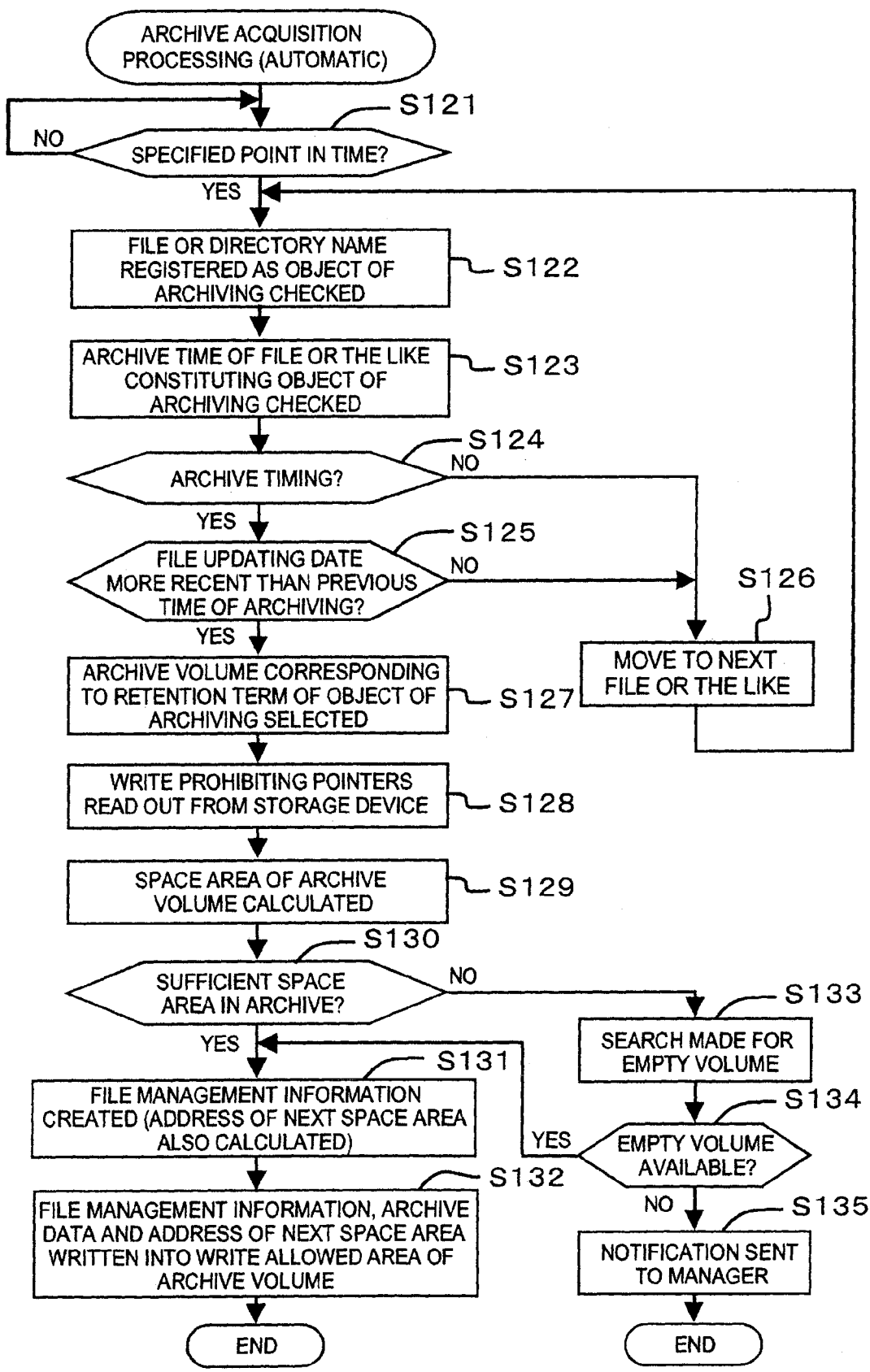
FIG. 18 is a flow chart showing processing for the automatic acquisition of archives.

FIG. 18 is a flow chart showing the processing whereby an archive is automatically obtained. This processing is executed each time that a specified point in time arrives (S121: YES).

The archive managing part 15A refers to the archive management table T10, and checks the file name or directory name that is registered as the object of archiving (S122). The archive managing part 15A also checks the archiving time of the file or the like that is the object of archiving (S123).

The archive managing part 15A judges whether or not the archiving time of this file or the like has arrived (S124). In cases where the archiving time has arrived (S124: YES), the archive managing part 15A judges whether or not the updating date and time of the file or the like is more recent than the updating date and time at the time of the previous archiving (S125). In cases where the most recent updating data and time of this file or the like is more recent than that of the previous archiving (S125: YES), this indicates that a difference has been generated in the file data, so that archiving is meaningful.

On the other hand, in cases where the archiving time set for this file or the like has not yet arrived (S124: NO), or in cases where the updating date and time of the file or the like matches the previous updating date and time (S125: NO), there is no need to store the data of this file or the like in the archive volume 400. Accordingly, the archive managing part 15A refers to the archive management table T10, and moves to the next file or the like (S126). Then, the archive managing part 15A repeats the processing of the abovementioned S122 through S125.

Next, the archive managing part 15A selects an archive volume 400 for which a retention term has been set that is the same as the retention term set for the file data that is the object of archiving (it is assumed here that this is the volume 400) (S127). Then, the archive managing part 15A respectively acquires the most recent values of the first pointer 401 and second pointer 402 from the control part 200A (S128).

On the basis of the values of the first pointer 401 and second pointer 402, the archive managing part 15A calculates the space area size of the archive volume 400 (S129), and judges whether or not there is a sufficient space area 440 in the archive volume 400 (S130).

In cases where a sufficient space area is present in the archive volume 400 (S130: YES), the archive managing part 15A creates file management information 431 for the file data that is the object of archiving (S131). In this case, the archive managing part 15A calculates the head address of the space area 440 in which the next file data is to be stored (S131).

The archive managing part 15A continuously writes the file data that is the object of archiving into the space area 440 from the head of the space area 440 (S132). The archive managing part 15A stores the file management information 431 and data proper 432 in the data storage area 420 of the archive volume 400, and stores the file management information 411 in the file management area 410.

In cases where a sufficient space area 440 is not present in the archive volume 400 (S130: NO), the archive managing part 15A searches for another utilizable empty volume (S133). In cases where a utilizable empty volume is found (S134: YES), the archive managing part 15A stores the file data in this volume (S131, S132). In cases where a utilizable empty volume cannot be found (S134: NO), the archive managing part 15A notifies the system manager that archiving cannot be performed because of insufficient empty capacity in the volume (S135).

Figure 19:
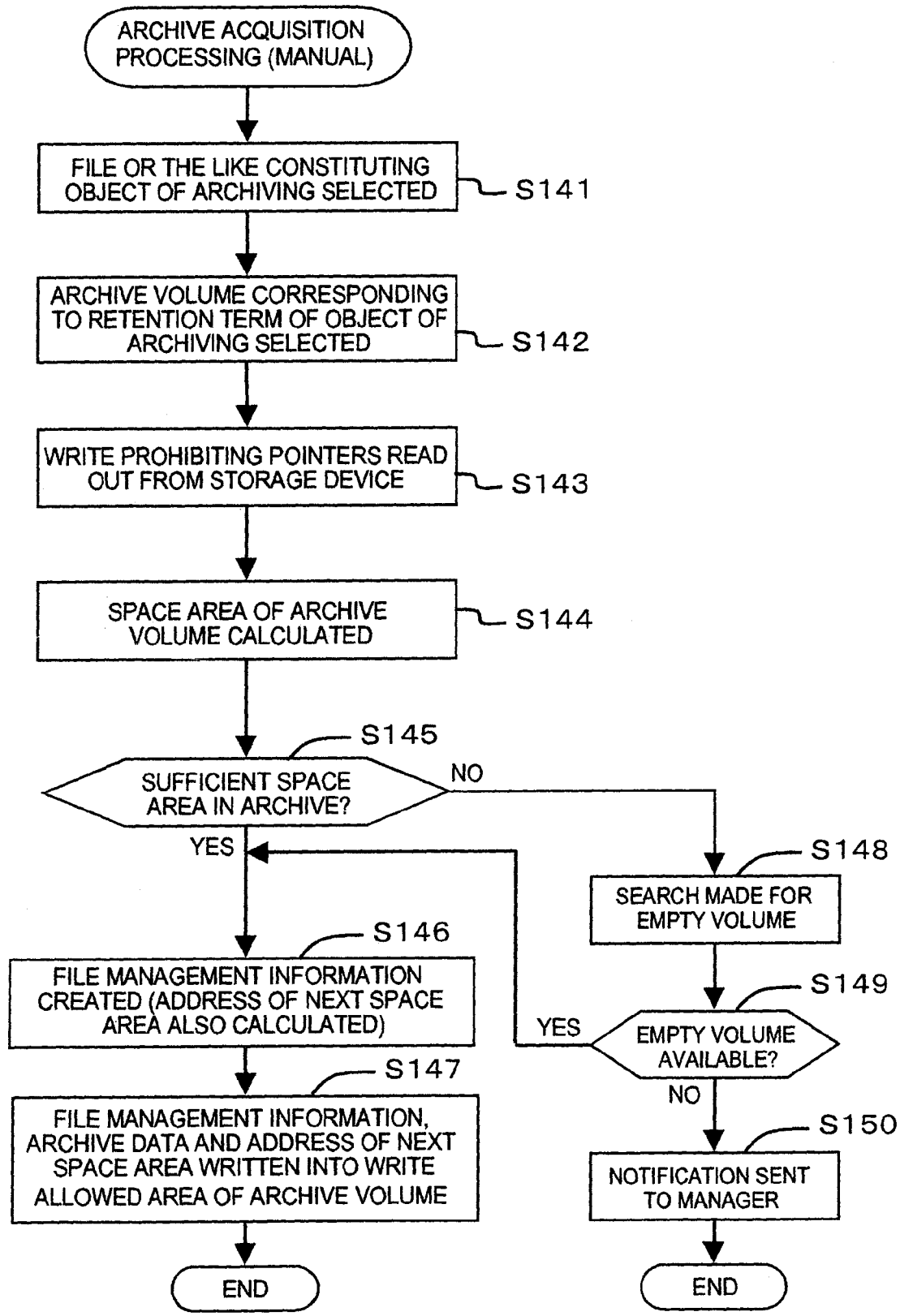
FIG. 19 is a flow chart showing processing for the acquisition of archives by indication through manual operation.

FIG. 19 is a flow chart showing an outline of the processing whereby an archive is acquired by instructions in a manual operation.

The system manager or the like selects the file or the like that is the object of archiving via the archive managing terminal 20 (S141). Next, via the archive managing terminal 20, the system manager or the like selects an archive volume 400 corresponding to the retention term set for the file or the like that is the object of archiving (S142). The term "archive volume corresponding to the retention term" is a volume for which a retention term is set that is the same as the retention term set for the file data that is the object of archiving.

When the archive volume that is used for archiving is selected, the archive managing part 15A respectively acquires the most recent values of the first pointer 401 and second pointer 402 from the control part 200A (S143). On the basis of the values of the first pointer 401 and second pointer 402, the archive managing part 15A calculates the space area size of the archive volume 400 (S144), and judges whether or not there is a sufficient space area 440 in the archive volume 400 (S145).

In cases where a sufficient space area is present in the archive volume 400 (S145: YES), the archive managing part 15A creates file management information 431 for the file data that is the object of archiving (S146). The archive managing part 15A then continuously writes the file data that is the object of archiving into the space area 440 from the head of the space area 440 (S147).

On the other hand, in cases where a sufficient space area 440 is not present in the archive volume 400 (S145: NO), the archive managing part 15A searches for another utilizable empty volume (S148). In cases where a utilizable empty volume is found (S149: YES), the archive managing part 15A stores the file data in this volume (S146, S147). In cases where a utilizable empty volume cannot be found (S149: NO), the archive managing part 15A notifies the system manager (S150).

Figure 20:
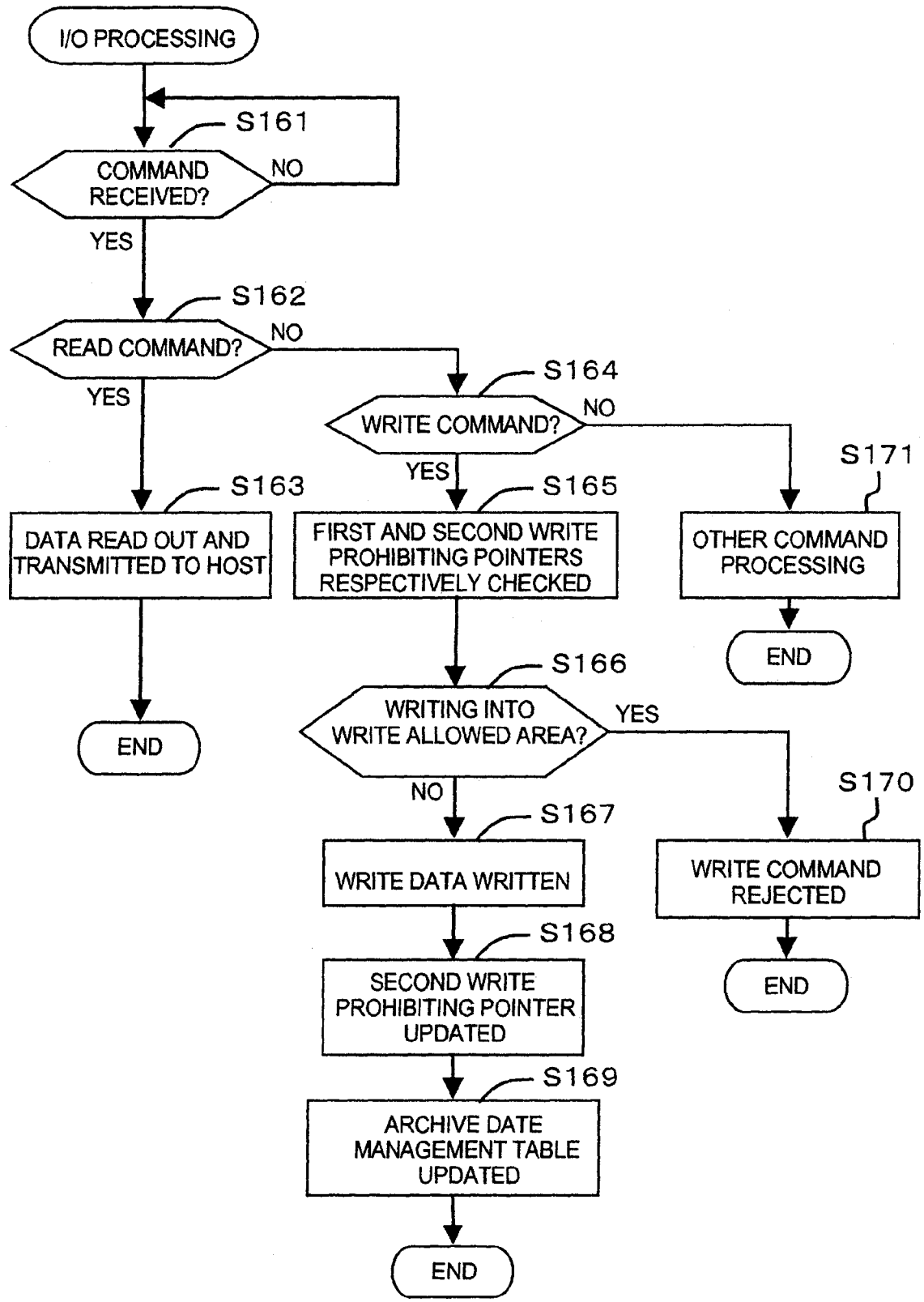
FIG. 20 is a flow chart showing I/O processing.

FIG. 20 is a flow chart showing the I/O processing that is performed by the control part 200A. When the control part 200A receives a command from the host 10 (S161: YES), the control part 200A judges whether or not this received command is a read command (S162).

In cases where this command is a read command (S162: YES), the control part 200A reads out the data requested by the host 10 from the on-line volume 300, and transmits this data to the host 10 (S163).

In cases where the command is not a read command (S162: NO), the control part 200A judges whether or not the command is a write command (S164). In cases where the command is a write command (S164: YES), the control part 200A respectively checks the values of the first pointer 401 and second pointer 402 (S165), and judges whether or not the command is a write command whose object is a write prohibited area 430 (S166).

In cases where this writing of data is not the writing of data into a write prohibited area 430 (S166: NO), the control part 200A writes the file data into a space area 440 (S167), and updates the value of the second pointer 402 (S168). Furthermore, the control part 200A updates the archive data management table T3 (S169).

In the case of a write command whose object is the write prohibited area 430 (S166: YES), the control part 200A rejects this write command (S169). In cases where the command received from the host 10 is neither a read command nor a write command (S164: NO), the control part 200A performs ordinary processing in accordance with this command (S170).

Figure 21:
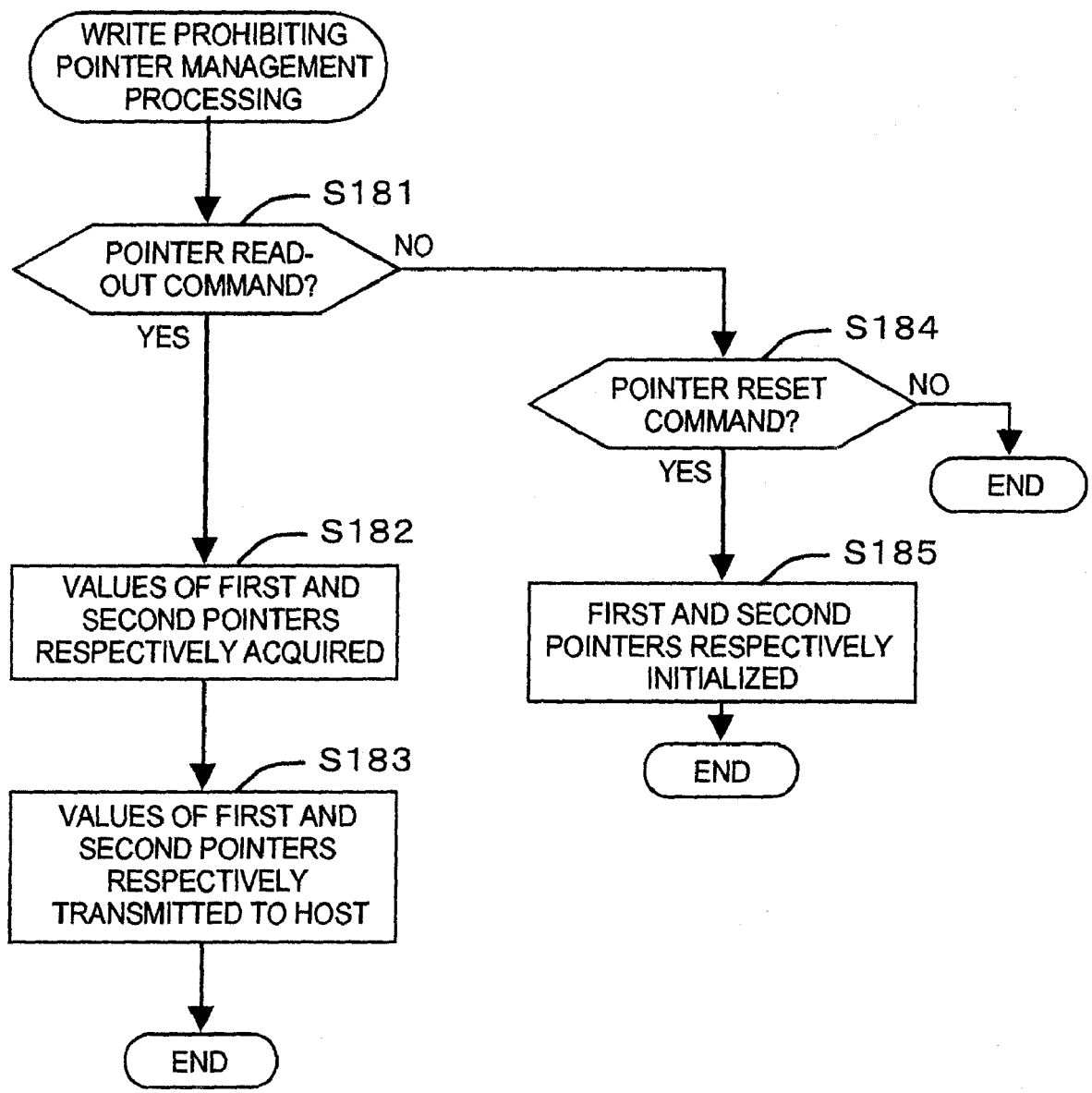
FIG. 21 is a flow chart showing write prohibiting pointer management processing.

FIG. 21 is a flow chart showing the write prohibiting pointer management processing. The control part 200A judges whether or not the read-out of the respective pointers 401 and 402 has been requested by the host 10 (S181).

In cases where the read-out of the values of the pointers 401 and 402 has been requested by the host 10 (S181: YES), the control part 200A respectively reads out the most recent values of the respective pointers 401 and 402 (S182), and respectively transmits these values to the host 10 (S183).

In cases where the read-out of the values of the pointers 401 and 402 has not been requested by the host 10 (S181: NO), the control part 200A judges whether or not the resetting of the respective pointers 401 and 402 has been requested by the host 10 (S184). In cases where the resetting of the respective pointers 401 and 402 has been requested (S184: YES), the control part 200A respectively resets the values of the pointers 401 and 402 to "0" (S185).

Figure 22:
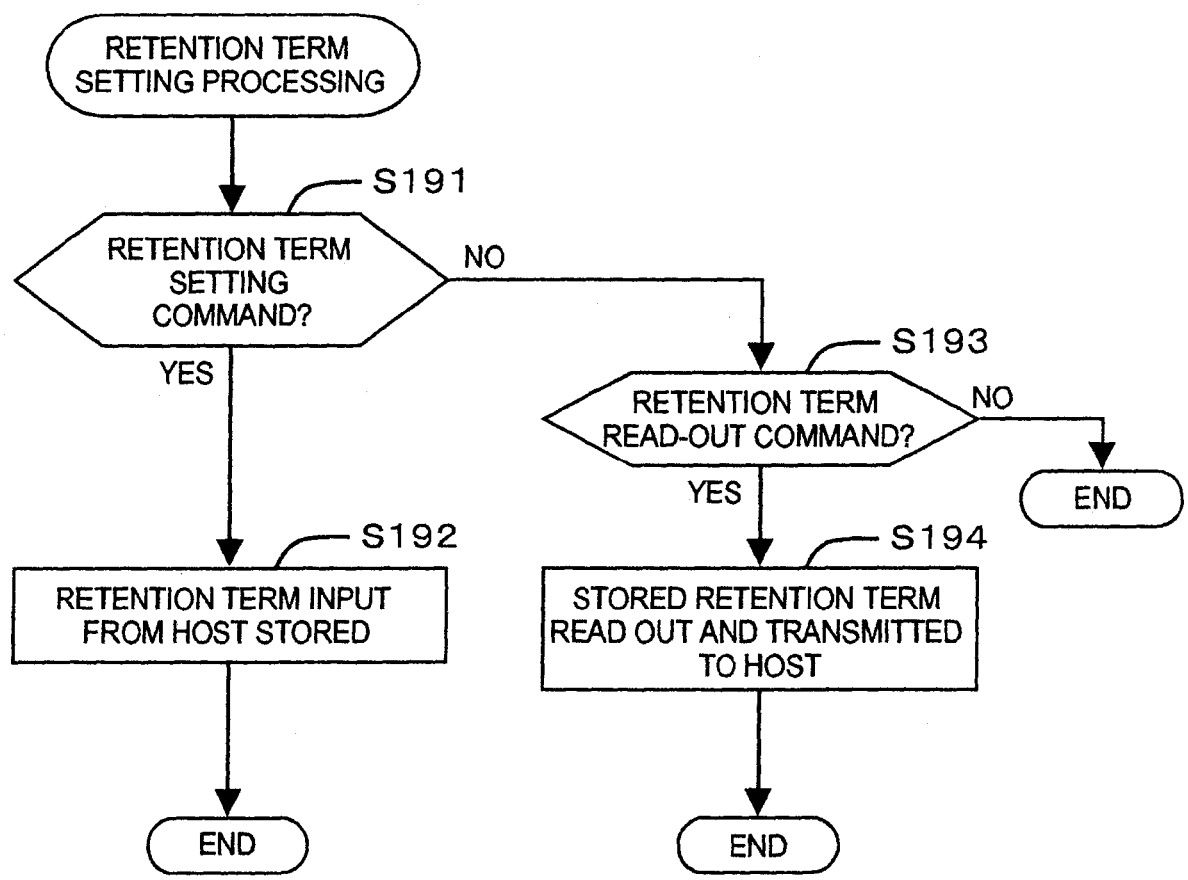
FIG. 22 is a flow chart showing retention term setting processing.

FIG. 22 is a flow chart showing the retention term setting processing. First, the control part 200A judges whether or not a command requesting the setting of the retention term has been received (S191). In cases where a retention term setting command has been received (S191: YES), the control part 200A sets the designated retention term for the designated archive volume (S192).

In cases where the command is not a command requesting the setting of the retention term (S191: NO), the control part 200A judges whether or not the command is a command requesting the read-out of the retention term (S193). In cases where read-out of the retention term is requested by the host 10 (S193: YES), the control part 200A reads out the held retention term, and transmits this retention term to the host 10 (S194). Furthermore, in cases where the command is not a retention term read-out command, either (S193: NO), the control part 200A ends this processing.

Figure 23:
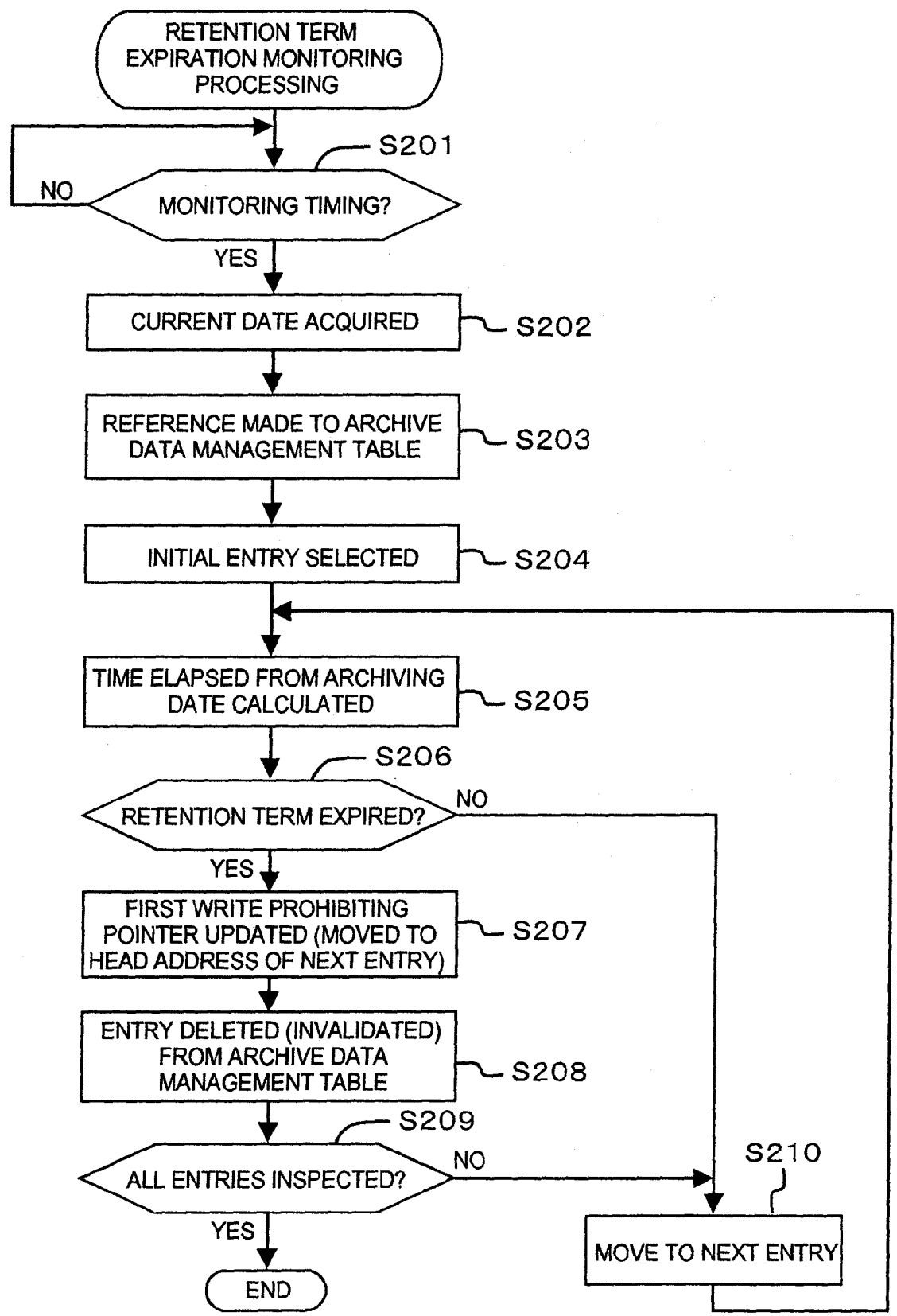
FIG. 23 is a flow chart showing retention term expiration monitoring processing.

FIG. 23 is a flow chart of the processing that monitors whether or not the retention term of the file data stored in the archive volume has expired. Here, the archive volume 400 is described as an example; however, this same description also applies to the case of the other archive volume 500.

The control part 200A judges whether or not the monitoring timing has arrived (S201). For example, this retention term monitoring processing can be started at a specified point in time every day. In cases where the monitoring timing has arrived (S201: YES), the control part 200A reads out the output value of the clock 240, and acquires the current date (S202).

The control part 200A refers to the archive data management table T3 (S203), and selects the head entry registered in this table T3 (S204). The control part 200A compares the storage date (registration date or archive date) of the file date registered in this first entry with the current date, and calculates the number of days elapsed from the time that the file data was stored in the archive volume 400 (S205).

The control part 200A compares the retention term designated for the file data with the number of days elapsed from the time at which the file data was stored in the archive volume 400, and judges whether or not the retention term for this file data has expired (S206).

In cases where the number of days elapsed exceeds the retention term (S206: YES), the control part 200A updates the value of the first pointer 401 (S207). Specifically, the head address of the file data that is positioned next after file data whose retention term has been judged to be expired is set as the first pointer 401.

Next, the control part 200A invalidates the entry for the file data whose retention term has expired by deleting this entry from the archive data management table T3 or the like (S208). The control part 200A then judges whether or not all of the entries registered in the archive date management table T3 have been inspected (S209).

In cases where uninspected entries are present (S209: NO), the control part 200A moves to the next entry in the archive date management table T3 (S210), and repeats the processing of S205 through S209. Likewise in cases where the retention term of the file data has not expired (S206: NO), the control part 200A moves to the next entry (S210), and repeats the processing of S205 through S209.

Thus, the control part 200A checks whether or not the retention term has expired for all of the file data stored in the archive volume 400, and when this inspection is completed (S209: YES), the processing is ended.

Figure 24:
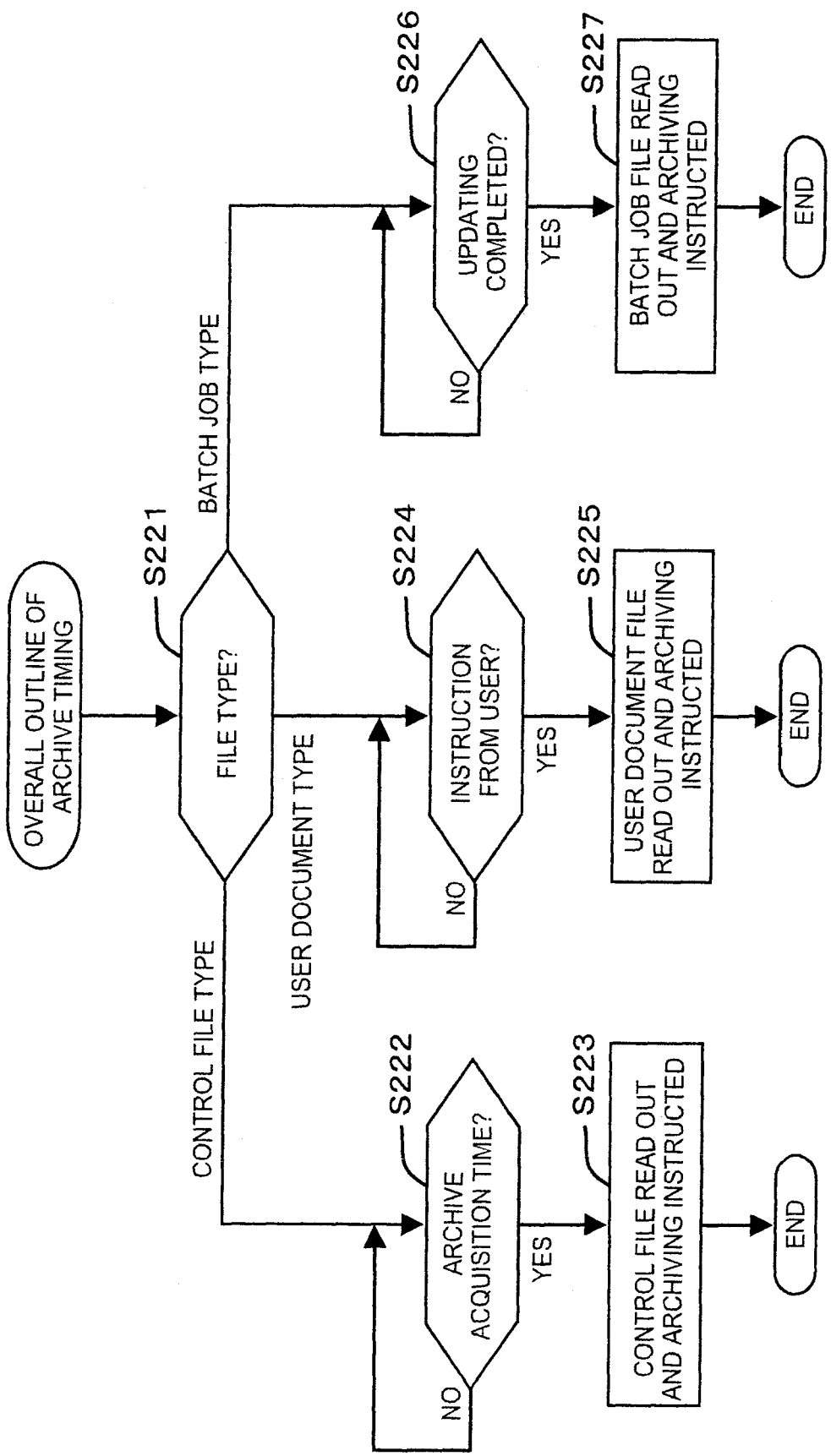
FIG. 24 is a flow chart showing an overall outline of respectively different archive timing in file types.

FIG. 24 is a flow chart showing an overall outline of the archive timing in model form. In the present example, as was described earlier, the files that are the object of archiving are patterned into a plurality of file types according to the archive timing (S221).

In the case of the control file type, the file data is read out from the on-line volume 300 to the host 10 at a specified period set beforehand by the system manager (S222), and is stored in a specified archive volume via the host 10 (S223).

In the case of the user document type, the execution of archiving is triggered by instructions from the user who is the preparer or owner of the file (S224). When there are such instructions from the user, the file data is stored in a specified archive volume via the host 10 from the on-line volume 300.

In the case of the batch job file type, the updating (or creation) of the file by the batch job program is the trigger for the execution of archiving (S226). The data of the batch job file is read out from the on-line volume 300 to the host 10, and is written into a specified archive volume via the host 10 (S227).

Figure 25:
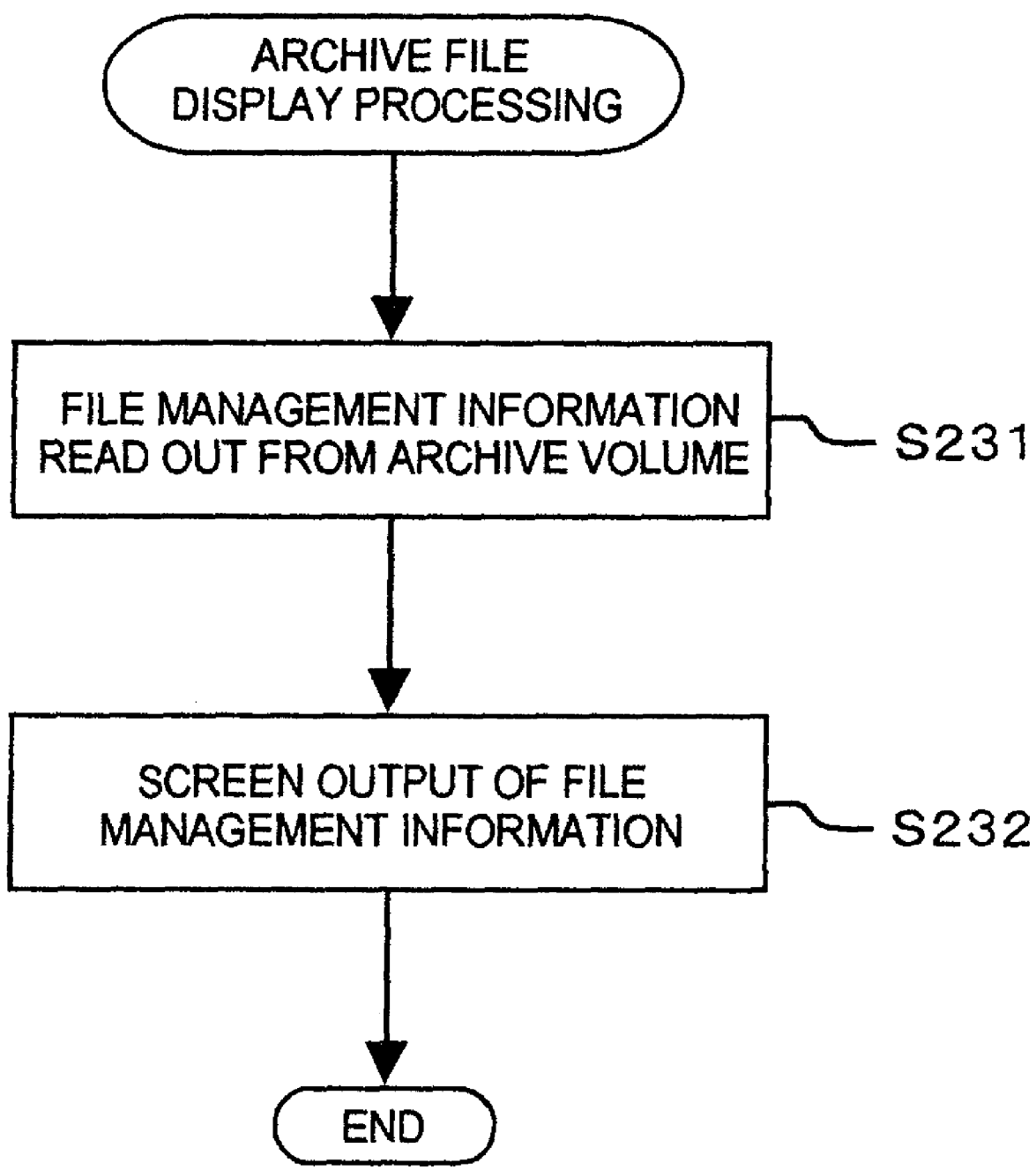
FIG. 25 is a flow chart showing archive file display processing.

FIG. 25 is a flow chart showing the processing that displays the respective files stored in the archive volume. The system manager or the like accesses the archive managing part 15A via the archive managing terminal 20, and can request viewing of the archived files. Here, a case in which the state of the archive volume 400 is displayed is described as an example; however, this description also applies to the case of the other archive volume 500.

The archive managing part 15A accesses the archive volume 400 designated by the system manager or the like, and respectively reads out all of the file management information 411 stored in the file management area 410 (S231). Here, since the file management area 410 is stored all together at the head of the volume 400, the archive managing part 15A can read out all of the file management information 411 at a high speed.

Then, on the basis of the acquired file management information 411, the archive managing part 15A creates a screen that is provided to the system manager or the like, and provides this screen to the archive managing terminal 20 (S232).

Figure 26:
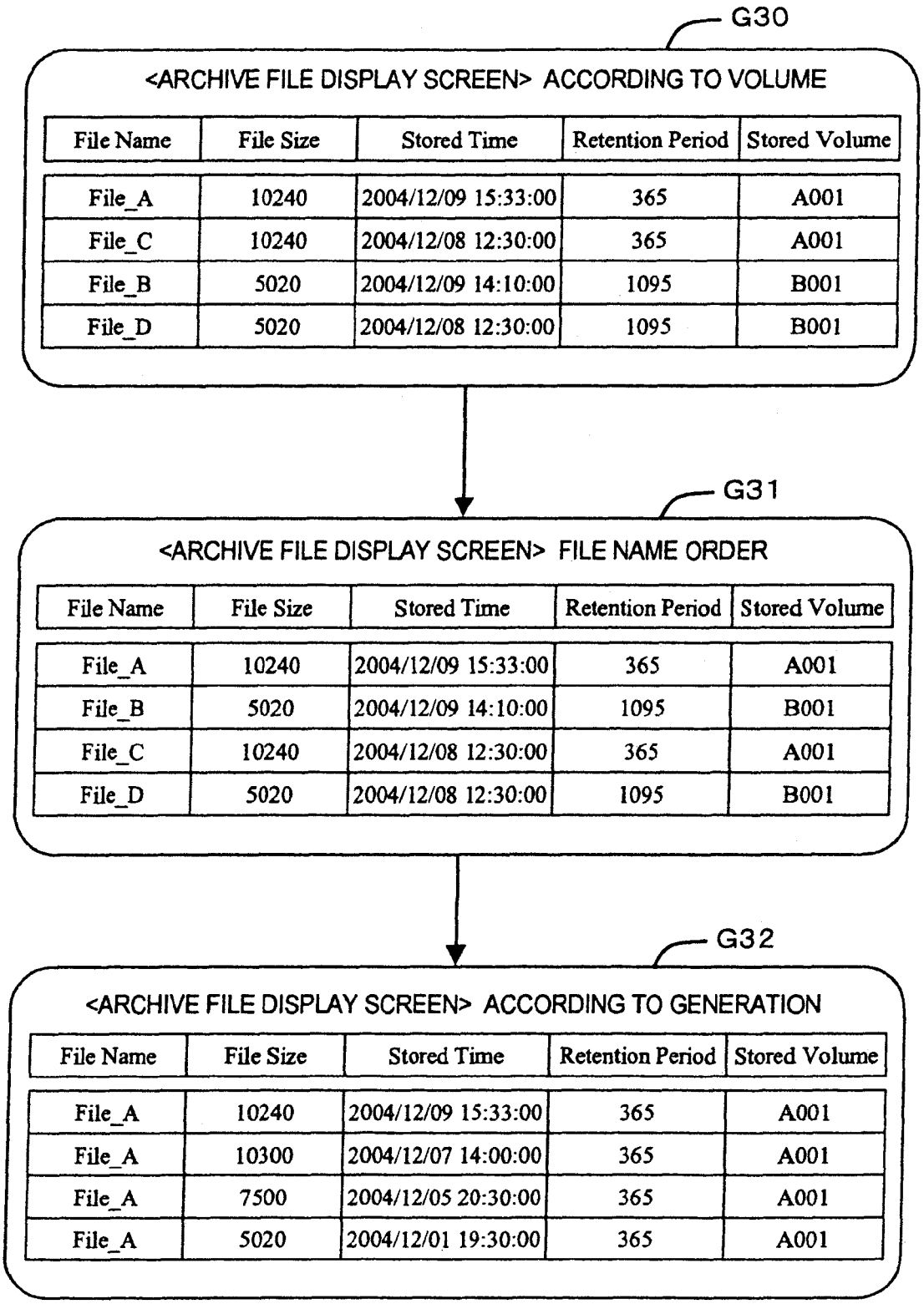
FIG. 26 shows examples of screens displaying archive files, with a case of display according to volume, a case of display in succeeding order of the file name, and a case of display according to generation.

FIG. 26 is an explanatory diagram showing examples of the display screens for the archive files (files stored in the archive volume) that are provided by the archive managing part 15A. The archive managing part 15A can freely switch among a plurality of screens G30, G31 and G32 on the basis of switching instructions that are input by the system manager or the like.

The first screen G31 displays respective archive files according to the archive volume. In this first screen G31, information on the files stored in the respective archive volumes is respectively displayed for each archive volume ("stored volume") shown on the right side of the screen. For instance, the file name, file size, storage date and retention term may be cited as examples of the displayed file information. By using the screen G31, the system manager or the like can easily grasp the types of files that are stored in the respective archive volumes.

The second screen G32 displays the respective archive files stored in all of the archive volumes sorted in file name order. For example, the sorting of the file names is based on an ASCII code. As a result, for example, the archive volumes in which the files are stored can easily be grasped according to file type, such as email data, sales data, customer data, specification data and the like.

The third screen G33 displays archive files according to generation. For the same archive object files, there may be cases in which these files are stored in the archive volume at a plurality of different points in time, either regularly or irregularly. In such cases, file data in which the storage date or contents vary slightly or greatly may be stored in the same archive volume for the same object.

Accordingly, in the third screen G33, a search is made for the respective file management information 411 using the designated file name as a search key, and a plurality of sets of file data with a common file name are displayed sorted in storage data order. As a result, it can easily be grasped how data of respective generations of the archive object files are stored.

As a result of being constructed as described above, the present example makes it possible to achieve effects similar to the effects described for the first example. In addition to these effects, the present example also makes it possible to achieve the following additional effects.

In the present example, various types of files 310 through 330 with respectively different archive timing are stored in archive volumes conforming to the designated retention terms. Accordingly, archiving can be performed at an appropriate timing for each file type, so that the archive management cost can be reduced and the reliability of the system can be improved.

For example, a construction in also conceivable in which all files regardless of file type are uniformly stored in the archive volume immediately after updating. In this case, however, even files that do not require archiving (e.g., user document type files) are uniformly archived, so that the archive volume quickly becomes filled with unneeded data.

Furthermore, for example, a construction is also conceivable in which all files regardless of file type are stored in the archive volume by a manual operation performed by the system manager or user. In this case, however, there is a possibility that the archiving of file data that is to be archived (e.g., control files) may be forgotten, so that the reliability of the archive processing drops. Moreover, in cases where all of the files in the on-line volume 300 are forcibly archived by instructions from the system manager, there is a danger that the archive volume will become filled with unnecessary archive files, so that the archive processing cost is increased.

In the present example, on the other hand, the attributes of the respective files 310 through 330 stored in the on-line volume 300 are noted, the respective files 310 through 330 are classified into a plurality of file types beforehand, and the archive timing is defined according to the respective file types. Accordingly, archiving can be performed at an appropriate timing in accordance with the respective file types, so that reliability can be improved while the archive processing cost is reduced.

In the present example, the beginning and end of the write prohibited area are respectively managed by means of a first pointer and second pointer. Furthermore, in the present example, the time elapsed from the storage of the file data in the archive volume and the retention term designated for the file data are compared, and storage areas containing file data whose retention term has expired are reused as space areas. Accordingly, the archive volume can be reutilized in a cyclical manner, so that the archive processing cost can be further reduced.

In the present example, information on files stored in the archive volume can be displayed in various forms G31 through G33. Accordingly, the system manager or the like can easily grasp the state of the archive volume from various standpoints.

3. Third Example

Figure 27:
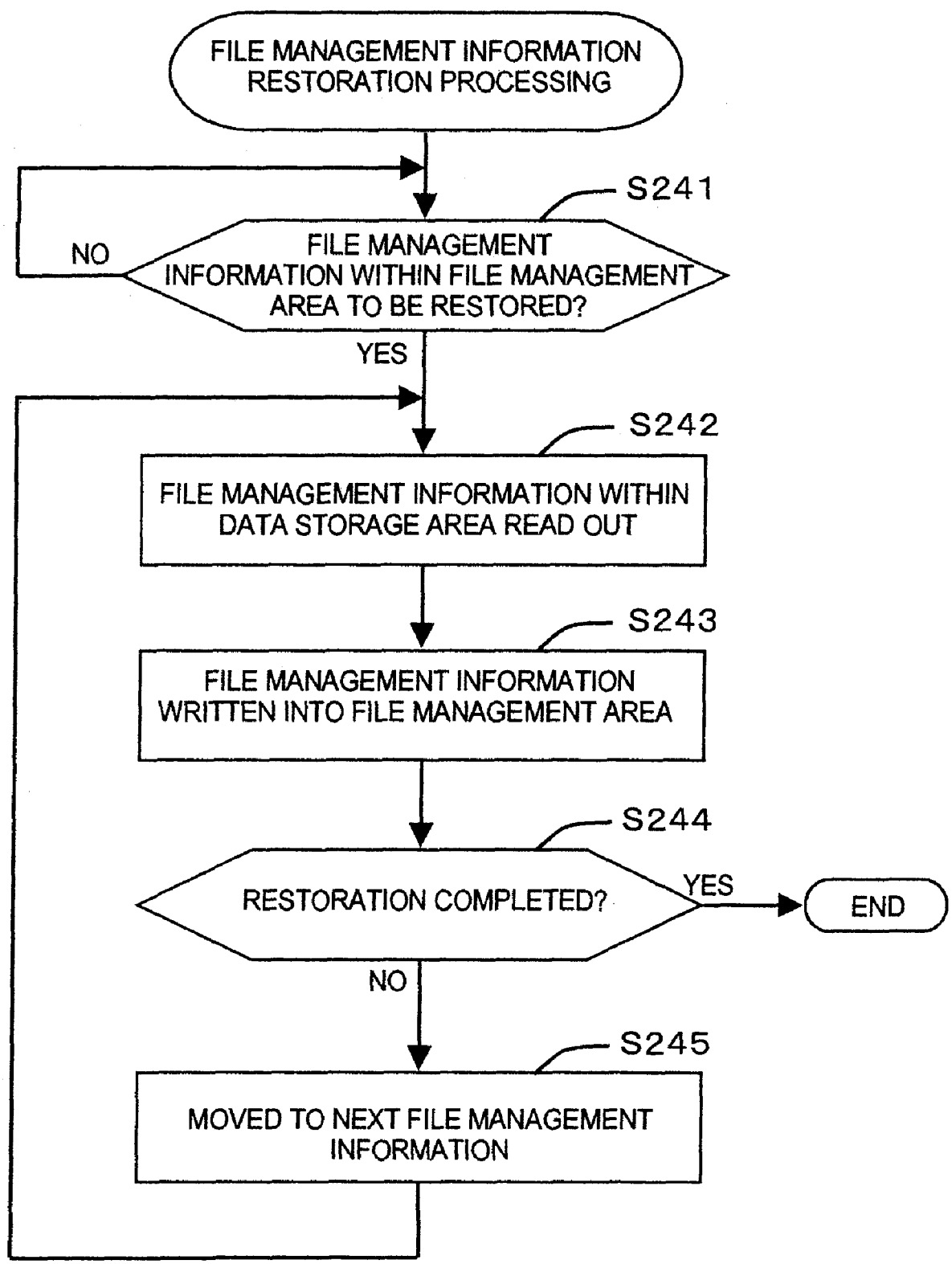
FIG. 27 is a flow chart showing the file management information restoration processing that is performed by the storage system of a third embodiment.

A third example will be described with reference to FIG. 27. In the present example, the stored contents of the file management area 410 are restored on the basis of the file management information 431 stored in the data storage area. FIG. 27 is a flow chart showing the processing that restores the file management information 411 stored in the file management area 410.

The control part 200 (or 200A, same below) judges whether or not the file management information 411 in the file management area 410 is to be restored (S241). Specifically, the control part 200 judges whether or not this processing is to be started. This processing can be started manually or automatically.

In cases where restoration processing is to be started (S241: YES), the control part 200 reads out the initial file management information 431 stored in the data storage area 420 (S242), creates file management information 411 corresponding to this file management information 431, and writes this information into the file management area 410 (S243).

The control part 200 restores the file management information 411 in order (S242, S243) while tracing the file management information 431 in the data storage area 420 in order (S245), until all of the file management information 411 is restored (S244: NO). When the restoration of the file management area 410 is completed (S244: YES), this processing is ended.

As was described above, the address at which the next file management information 431 is stored is contained in the file management information 431 in the data storage area 420. Accordingly, the control part 200 can perform read-out while tracing the information in order from the first file management information 431 to the last file management information 431. Frequency, since the archive volume 400 is a device that allows random access, the control part 200 can skip over the data proper 432 and immediately access the file management information 431. Thus, the file management area 410 can be quickly restored by coupling a construction that links the file management information 431 to following file management information 431, and a construction that allows random access.

4. Fourth Example

A fourth example will be described with reference to FIGS. 28 and 29. In the present example, the file names of the archive files are prominently displayed in the directory names, and the time stamps (storage dates) of data according to respective generations in the archive files are prominently displayed in the file names.

Figure 28:
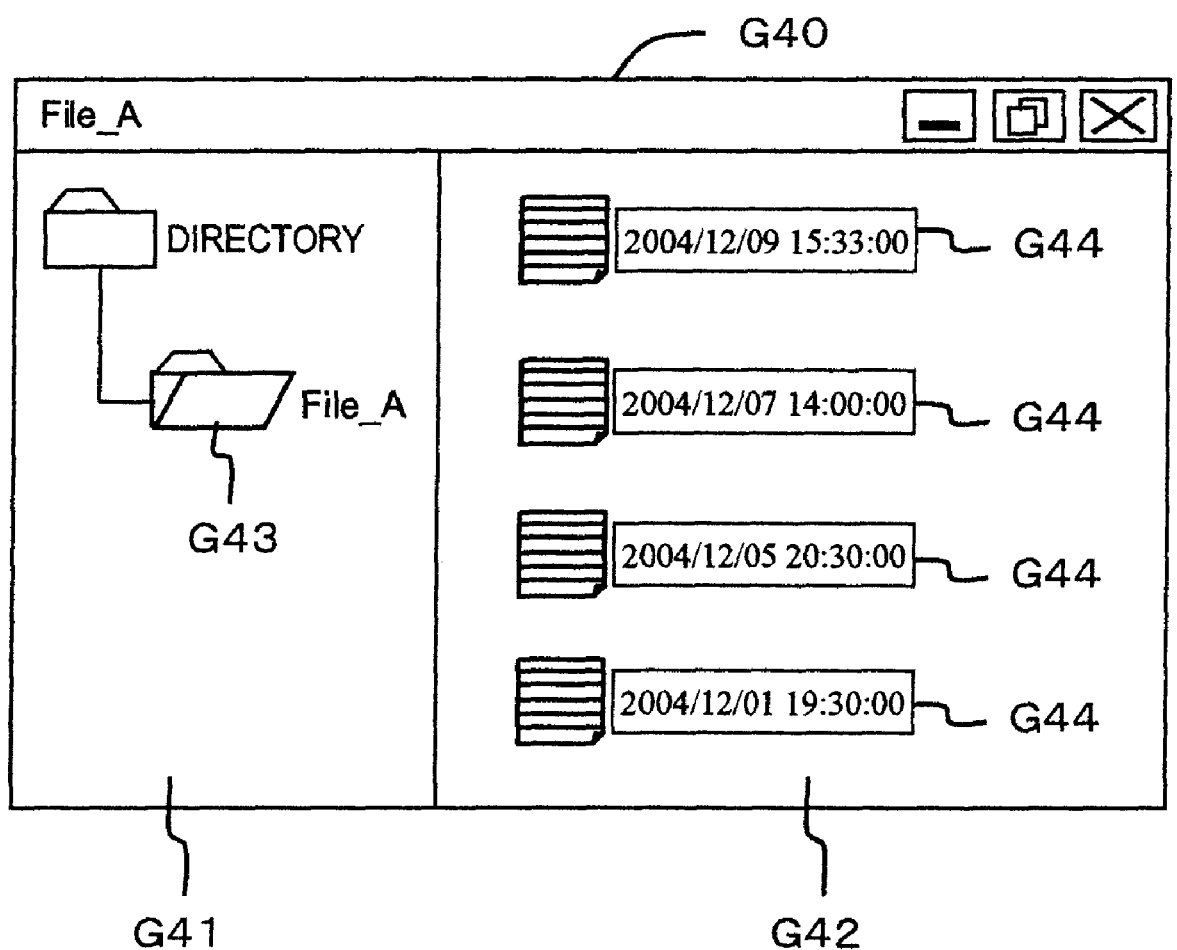
FIG. 28 is an explanatory diagram showing an example of a screen in which common file names are used as directory names, and time information possessed by data of respective generations is displayed as file names.

FIG. 28 is an explanatory diagram showing one example of the display screen G40 of this example. For example, this screen G40 comprises a directory structure display part G41 positioned on the left side, and a directory content display part G42 positioned on the right side.

In the structure display part G41, the file names of the files stored in the archive volume are displayed as virtual directory names G43. When these virtual directory names G43 are selected, the sets of file data G44 for each generation of the archive files are respectively displayed in the content display part G42. Such file data according to respective generations constitutes file names with respective "storage dates".

Figure 29:
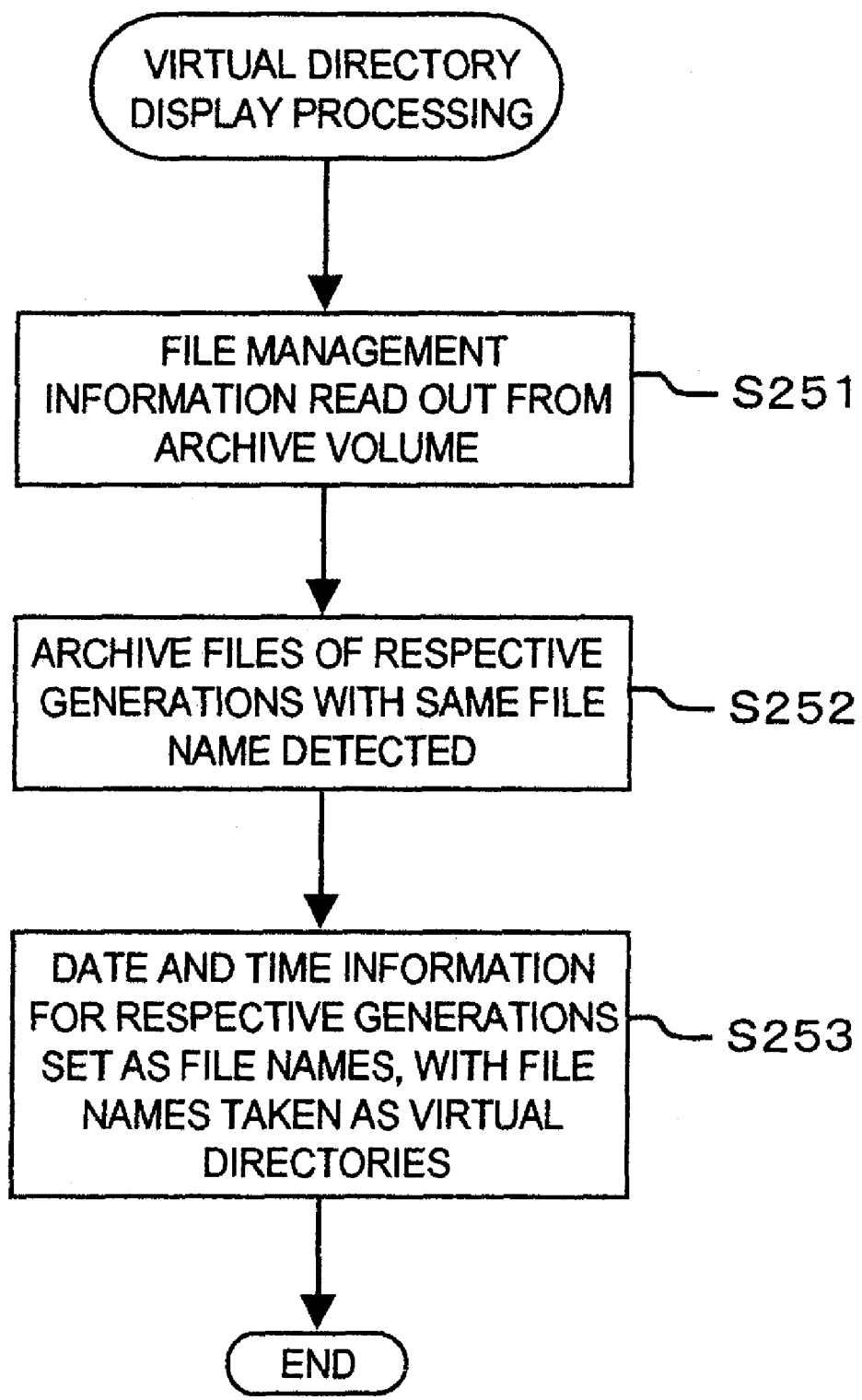
FIG. 29 is a flow chart showing virtual directory display processing.

FIG. 29 is a flow chart showing an outline of the processing that is performed in order to display the screen G40. The archive managing part 15 (or archive managing part 15A, same below) accesses the archive volume, and respectively acquires the file management information 411 (S251).

The archive managing part 15 sorts the file data according to each file name, and respectively detects file data of respective generations having the same file name (S252). Then, the archive managing part 15 takes the file name common to a plurality of sets of file data as a virtual directory name, and uses time information that discriminates the respective sets of file data as individual file names for the respective sets of file data (S253). As a result, the screen G40 shown in FIG. 28 can be provided.

Furthermore, for example, the date on which the file data was stored in the archive volume, the date and time of the updating of the original file at the time of storage of the file data in the archive volume, or information obtained by adding additional information to the storage data and time or updating data and time, can be used as the time information.

Thus, in the present example, for instance, a plurality of sets of file data successively archived over a plurality of generations can be displayed in a list with the common file names grouped as a virtual directory name. Accordingly, as is shown in the screen G40, a plurality of sets of file data archived at respectively different dates and times from common original files can be displayed in an easily viewable manner. As a result, the system manager or the like can simply grasp the conditions of archiving, and can easily select data of the desired generation.

Furthermore, the present invention is not limited to the embodiments described above; various additions, alterations and the like may be made by a person skilled in the art within the scope of the present invention. For example, a person skilled in the art may combine the respective examples described above.

Furthermore, for example, instead of a clock whose output value increases by 1 each day, the elapsed period of file data may also be managed using date information acquired from a time server, calendar server or the like. Furthermore, a construction may also be used in which the number of elapsed days for respective sets of file data is stored in the archive data management table, and updated on a daily basis.

What is claimed is:

1. A storage system comprising:
a host device; and
a storage device,
wherein said storage device comprises:
one or more memory devices that allow random access,
volumes which are produced based on said memory devices, and to which retention terms are assigned,
wherein a retention term for each volume is different from retention terms of the other volumes, and
a control part which performs data input/output with respect to said volumes in response to requests from said host device;
said host device comprises:
a file managing part which transmits one or more sets of file data conforming to said retention terms to said storage device and stores said sets of file data in said volumes according to said retention terms assigned to said volumes,
wherein said control part writes said file data input from said host device into areas of said volumes sequentially from the head of said file data, and controls the areas into which said file data has been written as write prohibited areas,
wherein said control part manages an elapsed time from when said file data is written into said areas of said volumes, and when the elapsed time reaches the retention terms, said control part reuses said areas in which said file data has been written such that said file data with same retention terms is added in succeeding order to said volumes,
wherein said file managing part can transmit a plurality of different types of file data respectively conforming to said retention terms to said storage device, and can respectively store said file data in said volumes,
wherein said file managing part can transmit a plurality of different types of file data that respectively conform to said retention terms, and that have respectively different triggers for storing said file data in said storage device, to said storage device, and can respectively store said file data in said volumes,
wherein said respective triggers include triggers that have periodicity and triggers that are aperiodic, and
wherein said file managing part can transmit a plurality of different types of file data that respectively conform to said retention terms, and can respectively store said file data in said volumes, and said plurality of different types of file data respectively include file data of a first file type for which a storage time is periodically indicated by the user of said file data, and file data of a second file type for which a storage time is periodically indicated by the manager of said file data.

2. The storage system according to claim 1, wherein said control part can reject write requests for said write prohibited areas by said host device, and can accept read requests for said write prohibited areas by said host device.

3. The storage system according to claim 1, wherein said control part manages the end addresses of said file data written into said volumes by means of write prohibiting pointers, judges whether or not the access requests from said host device are requests that relate to said write prohibited areas by comparing address information contained in the access requests from said host device with the end addresses indicated by said write prohibiting pointers, and prohibits writing into said write prohibited areas.

4. The storage system according to claim 1, wherein said control part respectively manages the head addresses and end addresses of said file data written into said volumes by means of first write prohibiting pointers and second write prohibiting pointers, judges whether or not the access requests from said host device are requests that relate to said write prohibited areas by comparing address information contained in the access requests from said host device with the head addresses and end addresses respectively indicated by said first write prohibiting pointers and second write prohibiting pointers, and prohibits writing into said write prohibited areas.

5. The storage system according to claim 1, wherein said control part manages the time elapsed from the storage of said file data in said volumes, and reuses this area in which this file data is stored as a space area when this elapsed time reaches said retention term.

6. The storage system according to claim 1, wherein said file managing part acquires the head address of a space area of said volume from said control part beforehand when a write request is issued to said storage device, and determines the write starting address of said write request based on this acquired head address.

7. The storage system according to claim 1, wherein said file managing part can issue a volume initializing request to said control part, and said control part changes said write prohibited area to a space area on the basis of said volume initializing request.

8. The storage system according to claim 1, wherein in cases where space areas of at least the specified quantity required in order to store said file data are not present in said volume, the control part causes said file data to be stored using another volume to which a retention term that is the same as the retention term assigned to said first volume is assigned.

9. The storage system according to claim 1, wherein said volumes each comprise a file management area and a data storage area, said file data that is input from said host device is stored in a non-rewritable manner in said data storage area, and first file management information for controlling said file data that is stored in said data storage area is stored in a rewritable manner in said file management area.

10. The storage system according to claim 9, wherein second file management information for controlling said file data is stored in a non-rewritable manner in association with said file data in said data storage area, and said first file management information and said second file management information are associated.

11. The storage system according to claim 10, wherein the head address of the file data that is to be stored next is contained in said second file management information.

12. The storage system according to claim 1, wherein in cases where said file data is respectively stored in a plurality of generations with respectively different storage times in said volumes, said file managing part can use directory names as the file names of said file data, and can provide time information that can discriminate said plurality of generations as file names for each of said respective generations.

13. A storage device archive control method for storing file data input from a host device in volumes of a storage device, comprising the steps of:
  creating said volumes based on one or more memory devices that allow random access;
  assigning retention terms designated by the host device to said volumes,
  wherein a retention term for each volume is different from retention terms of the other volumes;
  upon managing a file in the host device performing steps including:
  receiving said file data from said host device,
  selecting a volume for which a same retention term as a retention term associated with said received file data has been set,
  detecting areas in said selected volume,
  writing said received file data into said detected areas sequentially from the head, and
  controlling the areas into which said file data has been written as write prohibited areas,
  wherein said controlling step comprises:
  managing an elapsed time from when said received file data is written into said detected areas of said selected volume, and
  when the elapsed time reaches the retention term of said selected volume, reusing said detected areas in which said file data has been written such that said file data with a same retention term is added in succeeding order to said selected volume,
  wherein said managing a file including:
  transmitting a plurality of different types of file data respectively conforming to said retention terms to said storage device, and can respectively store said file data in said volumes,
  transmitting a plurality of different types of file data that respectively conform to said retention terms, and that have respectively different triggers for storing said file data in said storage device, to said storage device, and can respectively store said file data in said volumes,
  wherein said respective triggers include triggers that have periodicity and triggers that are aperiodic, and
  transmitting a plurality of different types of file data that respectively conform to said retention terms, and can respectively store said file data in said volumes, and said plurality of different types of file data respectively include file data of a first file type for which a storage time is periodically indicated by the user of said file data, and file data of a second file type for which a storage time is periodically indicated by the manager of said file data.

14. The storage device archive control method according to claim 13, further comprising the steps of:
  controlling the elapsed time from the writing of said file data into said volumes;
  monitoring whether or not said elapsed time has reached the retention term associated with said file data; and
  changing the area in which this file data is stored to a space area in cases where said elapsed time reaches the retention term of said file data.

15. The storage device archive control method according to claim 13, wherein said volumes each comprise a file management area and a data storage area, first file management information for controlling said file data that is stored in said data storage area is stored in a rewritable manner in said file management area, the file data input from said host device and second file management information for controlling said file data are respectively stored in a non-rewritable manner in said data storage area, said first file management information and said second file management information are associated, and said method further comprises the steps of:
  reading out all of the second file management information that is stored in said data storage area; and
  restoring said first file management information that is stored in said file management area based on this read-out second file management information.

* * * * *